United States Patent
Yano et al.

(10) Patent No.: US 6,681,033 B1
(45) Date of Patent: Jan. 20, 2004

(54) CAPACITANCE DETECTING APPARATUS AND ITS INSPECTING METHOD AND FINGERPRINT CHECKING APPARATUS

(75) Inventors: Motoyasu Yano, Kanagawa (JP); Masashi Takeda, Kanagawa (JP); Takeshi Koyama, Tokyo (JP); Keiichi Shinozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/439,084

(22) Filed: Nov. 12, 1999

(30) Foreign Application Priority Data

Nov. 16, 1998 (JP) .......................................... P10-324853
Apr. 13, 1999 (JP) .......................................... P11-105312

(51) Int. Cl.$^7$ ............................................. G06K 9/28
(52) U.S. Cl. ........................................ 382/124; 382/108
(58) Field of Search ............................... 382/124, 125, 382/126, 108; 356/71; 340/5.53, 5.83; 707/6; 713/186, 200; 902/3, 6

(56) References Cited

U.S. PATENT DOCUMENTS

| | | | |
|---|---|---|---|
| 4,061,945 A | | 12/1977 | Benda et al. |
| 5,225,959 A | * | 7/1993 | Stearns ........................ 361/283.1 |
| 5,325,442 A | * | 6/1994 | Knapp ........................ 361/278 |
| 6,049,620 A | * | 4/2000 | Dickinson et al. .......... 382/108 |
| 6,098,027 A | * | 8/2000 | Yang ........................ 324/519 |
| 6,137,557 A | * | 10/2000 | Hebiguchi et al. .......... 349/141 |
| 6,384,641 B1 | * | 5/2002 | Kase ........................ 327/91 |

FOREIGN PATENT DOCUMENTS

| | | |
|---|---|---|
| GB | 2 295 267 | 5/1996 |
| JP | 59-217932 | 12/1984 |
| JP | 6-89674 | 3/1994 |
| JP | 8-124502 | 5/1996 |
| JP | 10-144241 | 5/1998 |

* cited by examiner

Primary Examiner—Brian Werner
Assistant Examiner—Ryan J. Miller
(74) Attorney, Agent, or Firm—Rader, Fishman & Grauer PLLC; Ronald P. Kananen, Esq.

(57) ABSTRACT

When a current charge method is used as a method of detecting capacitance, there poses a problem in which S/N is deteriorated by a dispersion in element characteristics of a cell to be detected and when a voltage charge method is used, since parasitic capacitances of column sense lines are very large and accordingly, there is needed some devise for sampling electric charge charged to the capacitance. There are arranged unit cells having detection electrodes and cell selecting switches connected between the detection electrodes and column sense lines in an array shape, electric charge is charged from detecting circuits to the detection electrodes under constant charge voltage, and thereafter, the column sense lines are imaginarily grounded to thereby detect the capacitances formed between the detection electrodes and the surface of the finger in accordance with recesses and projections of a fingerprint via the column sense lines.

15 Claims, 16 Drawing Sheets

F I G. 13
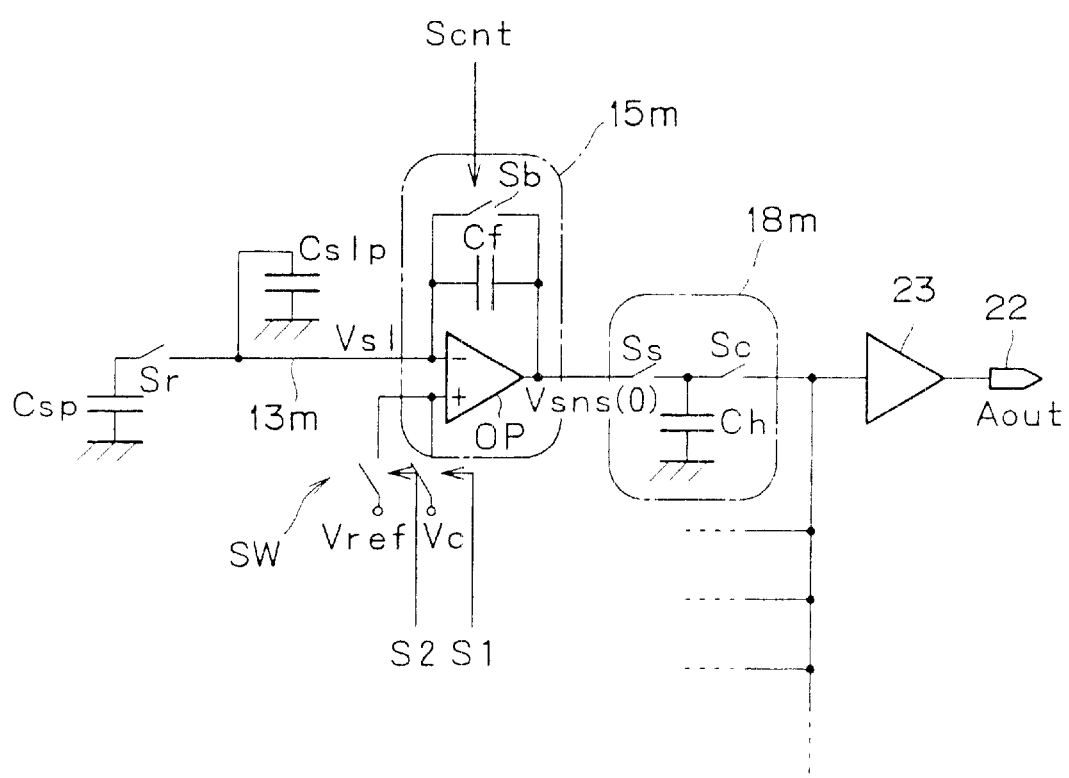

CAPACITANCE DETECTING APPARATUS AND ITS INSPECTING METHOD AND FINGERPRINT CHECKING APPARATUS

BACKGROUND OF THE INVENTION

1. Field of the Invention

The present invention relates to a capacitance detecting apparatus and its inspecting method as well as a fingerprint checking apparatus, particularly to a capacitance detecting apparatus preferably used as a fingerprint detecting apparatus and its inspecting method as well as a fingerprint checking apparatus using the detecting apparatus.

2. Description of Related Art

As a fingerprint detecting apparatus, there has been known a method in which detection electrodes are arranged in an array on a surface of a semiconductor and as shown by FIG. 17, when a finger is put on an overcoat 102 covering the detection electrodes 101, capacitances Cs formed in accordance with recesses and projections of a fingerprint between the detection electrodes 101 and a surface of the finger, are detected to thereby sample a pattern of a fingerprint (fingerprint pattern) (for example, refer to U.S. Pat. No. 5,325,442).

According to the capacitance Cs formed between the detection electrode 101 and the surface of the finger, a capacitance value is increased at a portion of a ridge or the fingerprint since a distance between the ridge portion and the detection electrode 101 is shortened, the capacitance is reduced at a portion of a valley of the fingerprint since a distance between the ridge portion and the detection electrode 101 is lengthened and accordingly, the pattern of the finger print can be sampled by detecting the capacitance Cs. As a method of detecting the capacitance Cs, there are conceivable two methods of a current charge method and a voltage charge method.

The former current charge method is a method in which after flowing constant current Ic during a constant time period of Tc from the detection electrode 101, that is, after charging constant electric charge ΔQ to the detection electrode 101, a voltage change ΔV of the detection electrode 101 is detected. The voltage change ΔV and the capacitance Cs are in an inversely proportional relationship as is apparent from the following equation (1).

$$\Delta V = \Delta Q / Cs = IcTc/Cs \qquad (1)$$

The latter voltage charge method is a method in which after charging electric charge to the detection electrode 101 by constant voltage ΔVc, the electric charge ΔQ is detected. The electric charge ΔQ and the capacitance Cs are in a proportional relationship as is apparent from the following equation (2).

$$\Delta Q = Cs \Delta Vc \qquad (2)$$

FIG. 18 shows a circuit constitution of a conventional example of a fingerprint detecting apparatus using the current charge method. In the drawing, row drive lines 111 and column sense lines 112 are wired in a matrix shape in respect of the detection electrodes 101 arranged in an array. An NchMOS transistor Q1 of a source follower and an NchMOS transistor Q2 for selecting a row are connected in series between a power source line 113 and the column sense line 112. Further, the gate of the MOS transistor Q1 is connected to the detection electrode 101 and the gate of the MOS transistor Q2 is connected to the row drive line 111, respectively.

Further, a PchMOS transistor Q3 and a charge current source Ic are connected in series between the power source line 113 and the ground. Further, the gate of the MOS transistor Q3 is connected to a reset line 114. Further, a common connection point P for connecting the MOS transistor Q3 and the charge current source Ic is connected to the detection electrode 101 via an NchMOS transistor Q4. Further, the gate of the MOS transistor Q4 is connected to a charge control line 115.

The circuit having the above-described constitution is provided to each of the detection electrodes 101, that is, the unit cell. Here, an explanation will be given of operation of the circuit in reference to timing charts of FIG. 19.

First, the MOS transistor Q2 is brought into an ON state by being applied with a row drive signal RAD at a high level (hereinafter, described as "H" level) via the row drive line 111 and successively, the MOS transistor Q4 is brought into an ON state by being applied with a charge control signal CEN at "H" level via the charge control line 115. Thereby, selection of row is carried out.

Simultaneously with the row selection, the MOS transistor Q3 is brought into an ON state by being applied with a reset signal XRST of a low level (hereinafter, described as "L" level) via the reset control line 114. Thereby, voltage (hereinafter, referred to as detection voltage) Vs of the detection electrode 101 is reset to power source voltage VDD which is reference voltage. Thereafter, by transition of the reset signal XRST to "H" level, the MOS transistor "Q3" is brought into an OFF state. Thereby, electric charge produced by the current source Ic starts charging to the detection electrode 101 via the MOS transistor Q4.

After elapse of the constant time period Tc, the charge control signal CEN transits to "L" level by which the MOS transistor Q4 is brought into an OFF state. Thereby, the electric charge finishes charging to the detection electrode 101. A change amount V at this occasion from resetting the detection voltage Vs is given by Equation (1). The detection voltage Vs is read by the row column sense line 112 via the MOS transistor Q1 of the source follower and the NchMOS transistor Q2 for selecting the row and is outputted to outside via the column sense line 112.

As described above, according to the conventional fingerprint checking apparatus using the current charge method, by detecting the voltage Vs of the detection electrode 101 produced by charging the constant electric charge ΔQ, the capacitance Cs formed between the detection electrode 101 and the surface of the finger can be detected. However, the detection voltage Vs is constituted to output via a plurality of transistors or in the case of this example, via the MOS transistors Q1 and Q2 and accordingly, there poses a problem in which S/N of the detection signal is deteriorated by a dispersion in characteristics of these transistors such as a threshold value Vth or ON resistance in respective cells.

Further, in order to efficiently sense the detection voltage Vs of the respective detection electrode 101, there are needed a plurality of the charge current sources Ic having the same current value (in the case of this example, the charge current sources Ic are prepared for the respective cells) and therefore, a dispersion in current values of these current sources Ic constitute one factor of deteriorating S/N.

Further, the voltage Vs must be sampled while maintaining the electric charge of the detection electrode 101 and accordingly, a source follower circuit (in the case of this example, MOS transistor Q1) needs to use, the gate of the MOS transistor Q1 is connected to the detection electrode 101 and accordingly, there is a concern of causing electrostatic breakdown at the gate portion when, for example, a charged finger is put thereon.

In the meantime, in the case of the voltage charge method, switching elements of a number of rows for selecting the rows are connected to respective column sense lines by a number of rows and accordingly, relative to the capacitance Cs to be sensed, parasitic capacitance Cs1p of the column sense line for sampling thereof is very large and therefore, in order to sample electric charge which is charged to the capacitance Cs, some devise is needed.

As an example, in the constitution shown by FIG. 17, when a size of the detection electrode 101 is set to 80 μm×80 μm, a material of the overcoat 102 is SiN and its thickness is set to 1.0 μm, assuming the specific inductive capacity of SiN as 7.5, a maximum value Cs (MAX) of the capacitance Cs becomes 425 (fF).

In contrast thereto, when a number of detection rows is set to 128, parasitic capacitance of the switching element to be connected is set to 5 (fF) and parasitic capacitance of wirings is set to 0.4 (pF/mm), the parasitic capacitance Cs1p of the column sense line is given as follows.

$$Cs1p = 128 \cdot 0.005 + 0.08 \times 128 \cdot 0.4$$
$$= 4.74 \text{ (pF)}$$

Therefore, the column sense line is attached with the parasitic capacitance Cs1p ten times as much as the capacitance Cs to be detected or more (Cs1p/Cs>10).

SUMMARY OF THE INVENTION

The present invention has been carried out in view of the above-described problem and it is an object of the present invention to provide a capacitance detecting apparatus resolving the problem of the current charge method by using the voltage charge method and capable of firmly sampling electric charge charged to capacitances by a simple circuit constitution, its inspecting method as well as a fingerprint checking apparatus using the detecting apparatus as a fingerprint detecting apparatus.

According to an aspect of the present invention, there is provided a capacitance detecting apparatus comprising unit cells having detection electrodes and switching elements connected between the detection electrodes and sense lines and arranged in an array shape, charging and discharging circuits for charging electric charge to the detection electrodes under constant voltage and discharging the electric charge and detecting circuits for imaginarily grounding the sense lines after charging the electric charge to the detection electrodes and detecting the electric charge of the detection electrodes via the sense lines to thereby detect capacitances formed between a detection object and the detection electrodes.

According to the capacitance detecting apparatus having the above-described constitution, the charging and discharging circuits charge electric charge to the detection electrodes of the unit cells under constant voltage. After the charging operation, the detecting circuits imaginarily ground the sense lines. By the imaginarily grounding operation, detected voltage detected by the detecting circuits via the sense lines, is not dependent on characteristics of the switching elements connected to the detection electrodes for the respective cells and a dispersion thereof is reduced. Further, the detecting circuits output the detected voltage having small dispersion as a result of detecting the capacitances formed between the detection object and the detection electrodes.

According to another aspect of the present invention, there is provided a capacitance detecting apparatus comprising unit cells having detection electrodes and switching elements connected between the detection electrodes and sense lines and arranged in an array shape, detecting means for detecting capacitances formed between a detection object and the detection electrodes by charging electric charge to the detection electrodes and detecting voltage based on the electric charge and dummy electrodes having parasitic capacitances substantially equal to parasitic capacitances of the detection electrodes, wherein electric charge of the parasitic capacitances of the detection electrodes is canceled by electric charge of the parasitic capacitances of the dummy electrodes.

According to the capacitance detecting apparatus having the above-described constitution, the parasitic capacitances are provided between the detection electrodes and a substrate. Further, when electric charge is charged to the detection electrodes, the electric charge is charged not only to the capacitances formed between the detection object and the detection electrodes but also to the parasitic capacitances of the detection electrodes. The electric charge of the parasitic capacitance of the detection electrode constitutes DC offset when the capacitance is sensed. In contrast thereto, by providing the dummy electrodes having the parasitic capacitances substantially equal to the parasitic capacitances of the detection electrodes, electric charge to the same degree of electric charge charged to the parasitic capacitances of the detection electrodes is charged also to the parasitic capacitances of the dummy electrodes. Accordingly, by utilizing electric charge the parasitic capacitances of the dummy electrodes, electric charge of the parasitic capacitances of the detection electrodes can be canceled. As a result, there is produced no DC offset caused by the parasitic capacitance of the detection electrode.

According to an inspecting method of a capacitance detecting apparatus of the present invention, in the respective capacitance detecting apparatus having the above-described constitution, attention is paid to the fact that when, for example, the finger is not put on the detection electrode, capacitance is not formed between the finger and the detection electrode, after charging electric charge to the detection electrode under constant voltage, electric charge of parasitic capacitance between the detection electrode and a substrate is read and the acceptability of a switching element is confirmed based on the read electric charge of the parasitic capacitance. Further, in the case of a capacitance detecting apparatus having dummy electrodes, in confirming the acceptability of the switching elements, a canceling function based on the parasitic capacitances of the dummy electrodes is stopped.

In the case in which, for example, the finger is not put on the detection electrodes, when electric charge is charged to the detection electrodes under constant voltage, the electric charge is accumulated only to the parasitic capacitances between the detection electrodes and the substrate. After the charging operation, the electric charge of the parasitic capacitances is read out. Thereby, even when the finger is not put on the detection electrodes, by reading the electric charge of the parasitic capacitances, the acceptability of the switching elements, that is, whether the switching elements operate normally can be confirmed. In the case of the capacitance detecting apparatus having the dummy electrodes, by stopping the canceling function, the acceptability of the switching elements can be confirmed without undergoing influence of the parasitic capacitances of the dummy electrodes.

A fingerprint checking apparatus according to the present invention uses the respective capacitance detecting apparatus having the above-described constitution as fingerprint detecting means. Further, the fingerprint checking apparatus includes storing means for storing pattern data of a fingerprint which has previously been registered and comparing means for comparing fingerprint data detected by the fingerprint detecting means with registered pattern information stored to the storing means and outputting a result of the comparison as a fingerprint checking result.

According to the fingerprint checking apparatus having the above-described constitution, firstly, pattern data of a fingerprint constituting a checking object is previously stored to the storing means as registered data. Further, the comparing means compares detected finger print data with the previously registered pattern data and when they coincide with each other, the comparing means determines that the detected fingerprint is the previously registered fingerprint and outputs a checking result stating the determination.

BRIEF DESCRIPTION OF THE DRAWINGS

FIG. 13 is an equivalent circuit diagram for explaining the operational principle of an inspecting method according to the present invention;

DETAILED DESCRIPTION OF THE PREFERRED EMBODIMENTS

Figure 1:
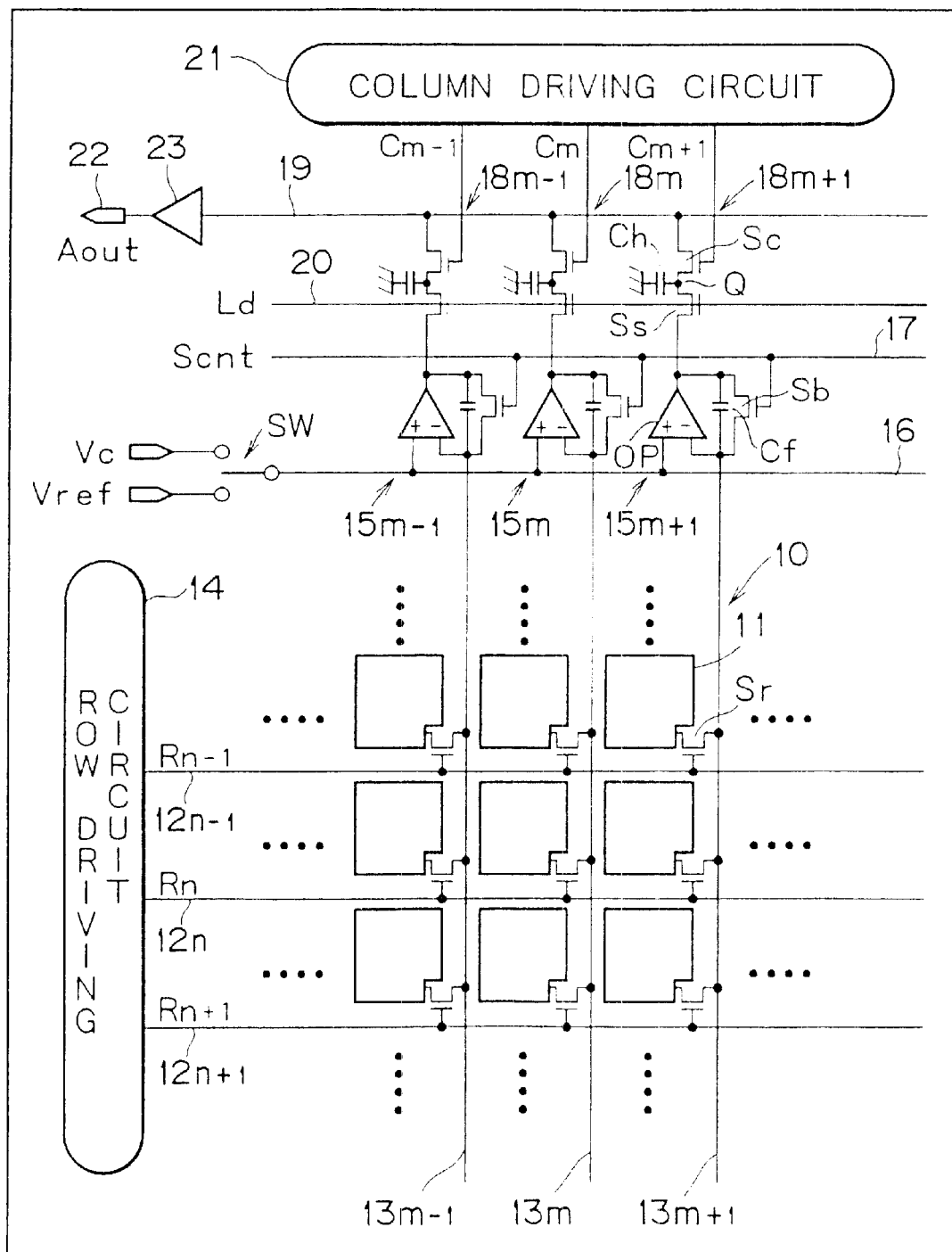
FIG. 1 is a total constitution diagram showing a capacitance detecting apparatus according to a first embodiment of the present invention.

A detailed explanation will be given of embodiments of the present invention in reference to the drawings as follows. FIG. 1 is a total constitution diagram showing a capacitance detecting apparatus according to a first embodiment of the present invention and in the drawing, there is shown an example of a case in which the capacitance detecting apparatus is used as a fingerprint detecting apparatus.

In FIG. 1, detection electrodes 11 are arranged in an array shape on a surface of a semiconductor and the detection electrodes 11 are wired with row selecting lines . . . , 12$n$–1, 12$n$, 12$n$+1, . . . and column sense lines . . . , 13$m$–1, 13$m$, 13$m$+1, . . . in a matrix shape. Further, cell selecting switches (for example, NchMOS transistors) Sr are connected between the respective detection electrodes 11 and the column sense lines . . . , 13$m$–1, 13$m$, 13$m$+1, . . . to thereby constitute unit cells 10 along with the detection electrodes 11.

The gates of the cell selecting switches Sr are connected to the row selecting lines . . . , 12$n$–1, 12$n$, 12$n$+1, . . . Respective ends of the row selecting lines . . . 12$n$–1, 12$n$, 12$n$+1, . . . are connected to output ends of respective rows of a row driving circuit 14. Respective ends of the column sense lines . . . , 13$m$–1, 13$m$, 13$m$+1, . . . are connected to respective circuit input ends of detecting circuits . . . , 15$m$–1, 15$m$, 15$m$+1, . . . A specific constitution of the detecting circuits . . . , 15$m$–1, 15$m$, 15$m$+1, . . . is a characterizing portion of the present invention.

That is, each of the detecting circuits . . . , 15$m$–1, 15$m$, 15$m$+1, . . . comprises an operational amplifier OP, an inverse phase (−) input end constituting the circuit input end of which is connected to each end of the column sense lines . . . , 13$m$–1, 13$m$, 13$m$+1, . . . and a positive phase (+) input end of which is connected to a voltage supply line 16, a feedback capacitor Cf connected between the inverse phase input terminal and an output end of the operational amplifier OP, and a bypass switch (for example, NchMOS transistor) Sb connected in parallel with the feedback capacitor Cf.

According to the detecting circuits . . . , 15$m$–1, 15$m$, 15$m$+1, . . . , the gates of the bypass switches Sb are connected to a control line 17. The voltage supply line 16 is alternatively applied with constant charge voltage Vc or predetermined reference voltage Vref via a change-over switch SW. Switching control of the change-over switch is executed by switch change-over signals S1 and S2 (refer to FIG. 2) provided from a timing controller (not illustrated). Further, the control line 17 is provided with a detecting circuit control signal Scnt from the timing controller.

Respective output ends of the detecting circuits . . . , 15$m$–1, 15$m$, 15$m$+1, . . . , that is, output ends of the operational amplifiers OP, are connected with respective input ends of sample and hold circuits . . . , 18$m$–1, 18$m$, 18$m$+1, . . . Each of the sample and hold circuits . . . , 18$m$–1, 18$m$, 18$m$+1, . . . comprises, for example, NchMOS transistors Ss and Sc connected in series between each of output ends of the detecting circuits . . . , 15$m$–1, 15$m$, 15m+1, . . . , an output signal line 19, and a hold capacitor Ch connected between a common connection point Q connecting these and the ground.

In the sample and hold circuits . . . , 18m−1, 18m, 18m+1, . . . , gates of the MOS transistors Ss are connected to a load line 20 and function as sampling switches. The load line 20 is provided with a load signal Ld from the timing controller, mentioned above. Further, the MOS transistors Sc function as column selecting switches by being applied with column selecting signals . . . , Cm−1, Cm, Cm+1, . . . from a column driving circuit 21. An output buffer 23 is connected between one end of the output signal line 19 and an output terminal 22.

Next, an explanation will be given of operation of a total of the capacitance detecting apparatus according to the first embodiment having the above-described constitution.

First, by providing row driving signals . . . , Rn−1, Rn, Rn+l, . . . to the row selecting lines . . . , 12n−1, 12n, 12n+1, . . . in this order by scanning in the row direction by the row driving circuit 14, the cell selecting switch Sr is brought into an ON state by a unit of a row and the detection electrode 11 of a corresponding row is selected. Then, electric charge accumulated in the respective detection electrodes 11 of the selected rows are supplied to the detecting circuits . . . , 15m−1, 15m, 15m+1, . . . via the respective cell selecting switches Sr and the column sense lines . . . , 13m−1, 13m, 13m+1, . . .

The detecting circuits . . . , 15m−1, 15m, 15m+1, . . . convert electric charge accumulated in the detection electrodes 11 of the selected rows into voltage in proportion thereto and supply the voltage to the sample and hold circuits . . . , 18m−1, 18m, 18m+1, . . . Respectives of the sample and hold circuits . . . , 18m−1, 18m, 18m+1, . . . hold respective output voltage of the detecting circuits . . . , 15m−1, 15m, 15m+1, . . . at the hold capacitors Ch by bringing the sampling switches Ss into an ON state by providing the load signal Ld. All of the columns are operated simultaneously until this moment.

Voltage held by the sample and hold circuits 18m−1, 18m, 18m+1, . . . of the respective rows are outputted in series from the output terminal 22 via the output signal line 19 and the output buffer 23 by successively outputting the column driving signals . . . , Cm−1, Cm, Cm+1, . . . by scanning in the row direction by the column driving circuit 21 and successively making from ON to OFF the column selecting switches Sc. By successively carrying out the above-described operation with respect to the rows selected by the row driving circuit 14, electric charge of all of the detection electrodes can be converted into voltage and successively outputted.

Figure 2:
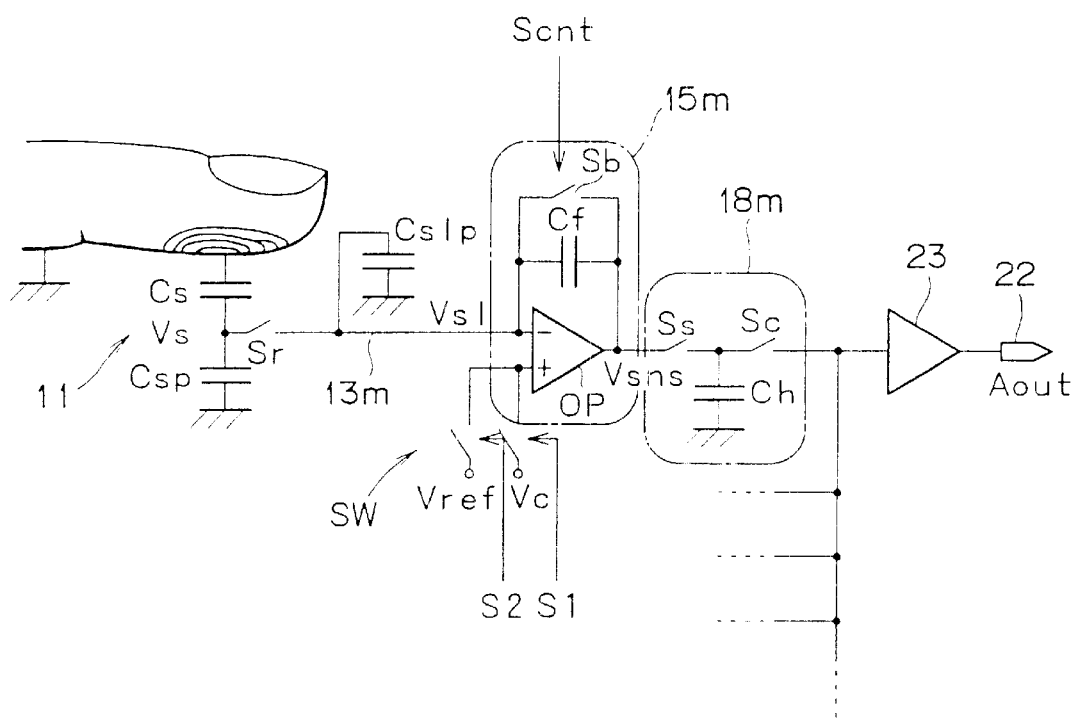
FIG. 2 is an equivalent circuit diagram for explaining the operational principle of the capacitance detecting apparatus according to the first embodiment.
Figure 3:
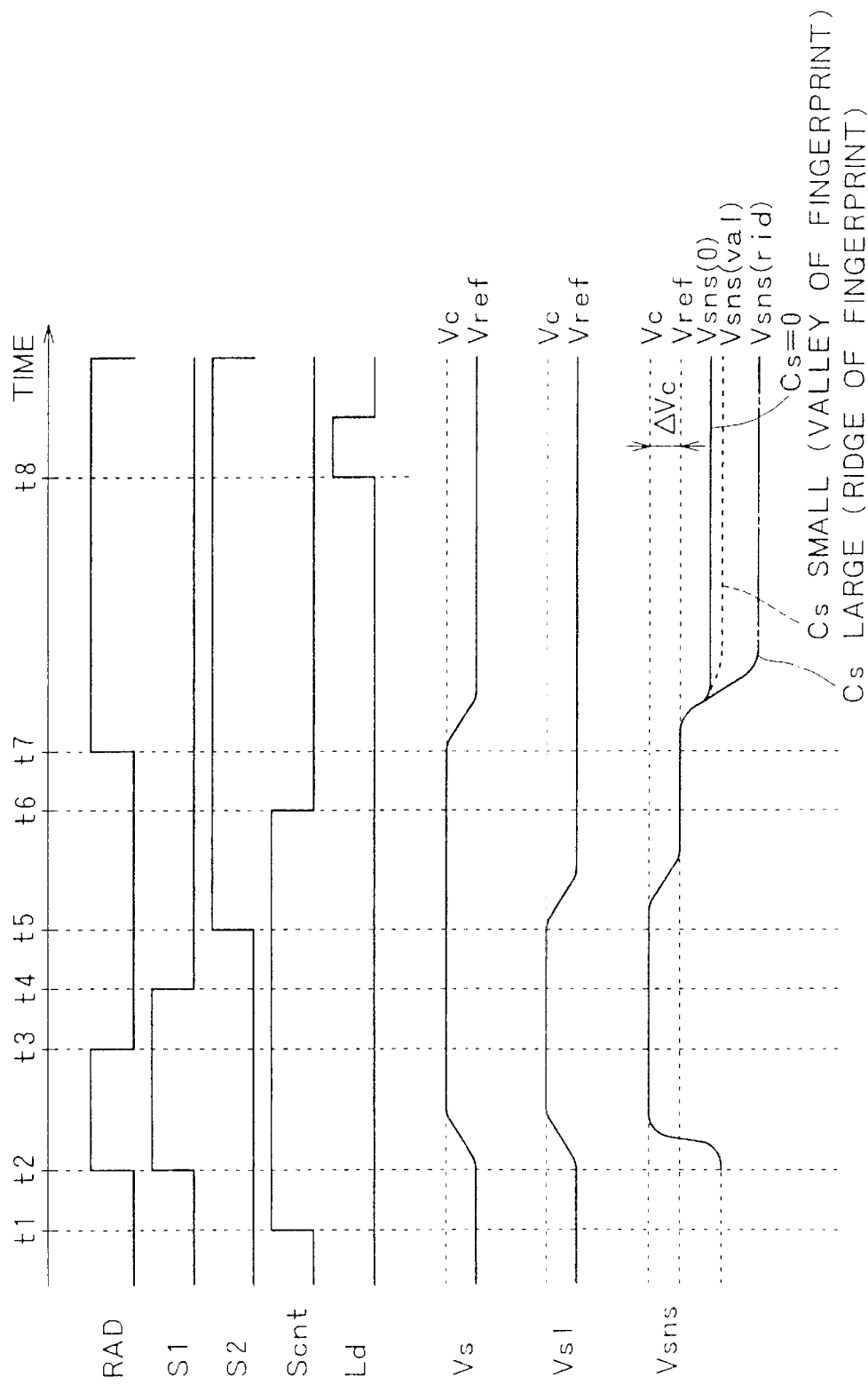
FIG. 3 illustrates timing charts for explaining the operational principle of the capacitance detecting apparatus according to the first embodiment.

An explanation will be given here of operation of the detecting circuits . . . , 15m−1, 15m, 15m+1, . . . constituting the characterizing point of the present invention by taking an example of a case of the detecting circuit 15m at m row in reference to FIG. 2 and FIG. 3. FIG. 2 is an equivalent circuit diagram for explaining the operational principle by extracting a route from the selected one of the detection electrode 11 to the output terminal 22. Further, FIG. 3 illustrates timing charts for explaining the operational principle.

First, at time t1, by providing the detecting circuit control signal Scnt at "H" level, the bypass switch Sb is brought into an ON state. Thereby, the detecting circuit 15m is provided with a constitution of a voltage follower circuit. That is, the detecting circuit 15m is operated as a noninverting amplifying circuit in which the input resistance is very large, the output resistance is substantially equal to null and the voltage amplifying degree becomes Av=1.

Next, at time t2, by providing the row driving signal RAD ( . . . , Rn−1, Rn, Rn+1, . . . ) at "H" level from the row driving circuit 14, the cell selecting switch Sr is brought into the ON state to thereby connect the detection electrode 11m and the column sense line 13m. Simultaneously therewith, by providing the switch change-over signal S1 at "H" level, the change-over switch SW selects the charge voltage Vc and the charge voltage Vc is provided to the operational amplifier OP as its positive phase input.

At this occasion, the operational amplifier OP executes the voltage follower operation and therefore, the voltage Vs1 of the column sense line 13m connected to the output end of the operational amplifier OP via the bypass switch Sb and the voltage Vs of the detection electrode 11 connected to the column sense line 13m via the cell selecting switch Sr, becomes the charge voltage Vc. Thereby, the capacitance Cs formed between the detection electrode 11 and the surface of the finger (fingerprint) and a parasitic capacitance Csp between the detection electrode 11 and a substrate are stored with electric charge in proportion to capacitance values of these.

Next, at time t3, the row driving signal RAD ( . . . , Rn−1, Rn, Rn+1, . . . ) transits to "L" level by which the cell selecting switch Sr is brought into the OFF state. At this moment, even in the case in which the cell selecting switch Sr is brought into the OFF state, electric charge accumulated in the detection electrode 11 is held and accordingly, the voltage Vs of the detection electrode 11 remains unchanged and stays to the charge voltage Vc.

Next, at time t4, the switch change-over signal S1 transits to "L" level, successively, at time t5, the change-over switch S2 transits to "H" level by which the change-over switch SW provides the reference voltage Vref to the operational amplifier OP as its positive phase input. Then, at this occasion, the voltage Vs1 of the column sense line 13m is changed to the reference voltage Vref.

At this moment, the cell selecting switch Sr is brought into the OFF state, the detection electrode 11 is separated from the column sense line 13m and therefore, electric charge accumulated in the capacitance Cs between the detection electrode and the fingerprint and in the parasitic capacitance Csp between the detection electrode and the substrate is held. Accordingly, the voltage Vs of the detection electrode 11 remains unchanged and stays to be the charge voltage Vc.

Next, at time t6, the detecting circuit control signal Scnt transmits to "L" level by which the bypass switch Ab is brought into the OFF state. At this moment, the operational amplifier OP is negatively fed back by the feedback capacitor Cf and the column sense line 13m is imaginarily grounded to the reference voltage Vref.

Next, at time t7, the row driving signal RAD transits again to "H" level, then, the cell selecting switch Sr is brought into the ON state. Thereby, the detection electrode 11 the voltage Vs of which has been the charge voltage Vc, is connected to the column sense line 13m which has been imaginarily grounded to the reference voltage Vref and therefore, the voltage Vc of the detection electrode 11 is changed from the charge voltage Vc to the reference voltage Vref. As a result, electric charge in accordance with the voltage change flows from the capacitance Cs and the parasitic capacitance Csp and is accumulated in the feedback capacitance Cf.

At this moment, the electric charge $\Delta Q$ flowing out from the detection electrode 11 is as shown by the following equation.

$$\Delta Q = (Cs + Csp) \cdot (Vc - Vref)$$

The electric charge ΔQ is accumulated in the feedback capacitance Cf and accordingly, the output voltage Vsns of the operational amplifier OP becomes as shown by the following equation.

$$Vsns = Vref - (Cs+Csp) \cdot (Vc-Vref)/Cf \qquad (3)$$

Further, when ΔVc is defined as Vc−Vref=ΔVc, the following equation is established.

$$Vsns = Vref - \Delta VcCs/Cf - \Delta VcCsp/Cf \qquad (4)$$

At time t8, in the sample and hold circuits . . . , 18*m*−1, 18*m*, 18*m*+1, . . . provided to the respective columns, the load signal Ld at "H" level is provided and the sampling switches Ss are brought into the ON state by which the respective output voltages Vsns of the detecting circuits . . . , 15*m*−1, 15*m*, 15*m*+1, . . . are held in the hold capacitors Ch. Thereafter, the column selecting switches Sc are successively made from ON to OFF by scanning by the column driving circuit 21 by which the respective output voltages Vsns are outputted in series to the output signal line 19.

Figure 4:
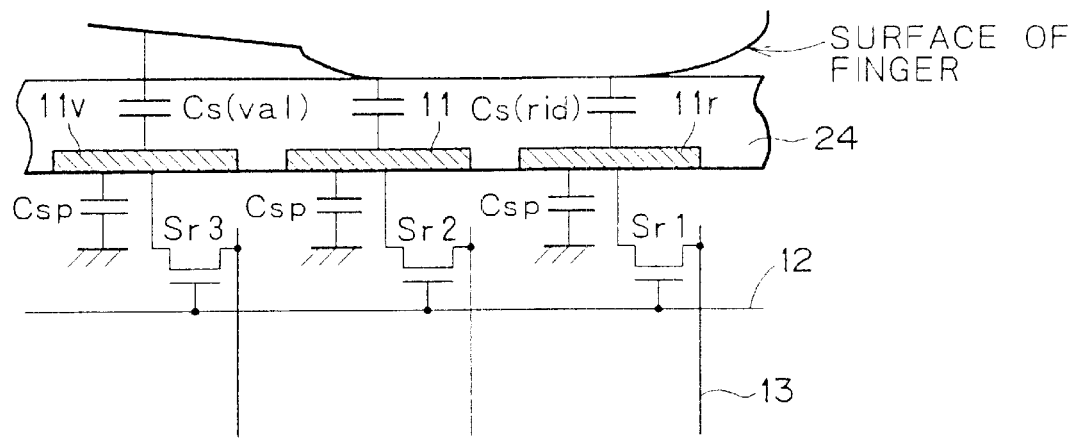
FIG. 4 is a sectional view of peripheral portions of detection electrodes.

At this occasion, for example, as shown by FIG. 4, when a detection electrode 11*r* to which a portion of a ridge of the fingerprint is proximate, is selected, the capacitance value of the capacitance Cs becomes large and accordingly, low voltage Vs is outputted and when a detection electrode 11*v* to which a portion of a valley of the fingerprint is proximate, is selected, the capacitance value of the capacitance Cs becomes small and accordingly, voltage Vs which is higher than that in the case in which the ridge is proximate thereto is outputted.

In this way, when the finger is put on the overcoat 24 covering the detection electrodes 11 arranged in an array shape, the capacitances Cs formed in accordance with recesses and projections of the fingerprint between the detection electrodes 11 and the surface of the finger, are detected by using the voltage charge method in which electric charge is charged to the detection electrodes 11 under the constant charge voltage Vc and thereafter, the electric charge is detected by which the output voltage Vsns in accordance with recesses and projections (pattern) of the fingerprint can be derived.

As described above, according to the capacitance detecting apparatus of the first embodiment, electric charge is charged to the detection electrodes 11 under the constant charge voltage Vc and thereafter, the column sense lines . . . , 13*m*−1, 13*m*, 13+1, . . . are imaginarily grounded by which the output voltage Vsns is not dependent upon characteristics of the cell selecting switches Sr connected to the detection electrodes 11 for the respective cells, further, the reference voltage Vref and the charge voltage Vc can accurately be distributed to the respective detection electrodes 11 and therefore, a dispersion in the output voltage of the respective detection electrodes 11 is reduced and the voltage in accordance with recesses and projections of the fingerprint can be sampled with excellent S/N.

Further, there is adopted a constitution in which the column sense lines . . . , 13*m*−1, 13*m*, 13*m*+1, . . . serve also as charge/discharge lines in charging and discharging electric charge to and from the detection electrodes 11 under the charge voltage Vc and the charge and discharge circuits serve also as the detecting circuits . . . , 15*m*−1, 15*m*, 15*m*+1, . . . and therefore, the peripheral circuits can be simplified. Accordingly, the element density and the wiring density are low and the high yield can be expected. However, the present invention is not limited to the circuit constitution serving in both ways but as a basic way of thinking, there can be adopted a circuit constitution in which charge and discharge circuits and charge/discharge lines thereof are provided exclusively.

Further, there is constructed the constitution in which electric charge which is charged to the detection electrode 11 is detected and accordingly, as is apparent from FIG. 1, the detection electrode 11 may be connected with the source (or drain) of an MOS transistor which is the cell selecting switch Sr. Thereby, a parasitic diode is present between the source (or drain) and the backgate (well) in the cell selecting switch Sr and operates as a static electricity protecting element and accordingly, there can be constituted the detecting circuit which is strong at the electrostatic intensity.

Figure 5:
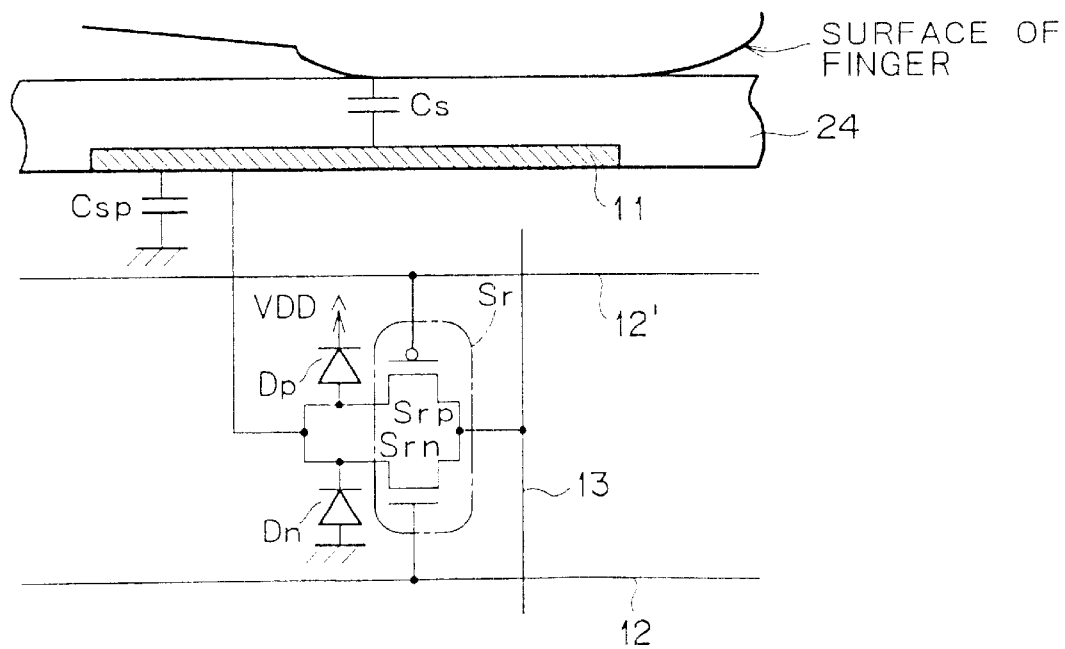
FIG. 5 is a circuit diagram when CMOS transistors are used in a switching element.

Particularly, as shown by FIG. 5, when CMOS transistors Srp and Srn are used as the cell selecting switch Sr, parasitic diodes Dp and Dn are inserted respectively between the detection electrode 11 and power source VDD and between the detection electrode 11 and the ground, both of the parasitic diodes Dp and Dn operate as electrostatic protecting elements and therefore, there can be constituted a detecting apparatus strong at electrostatic breakdown.

Figure 6:
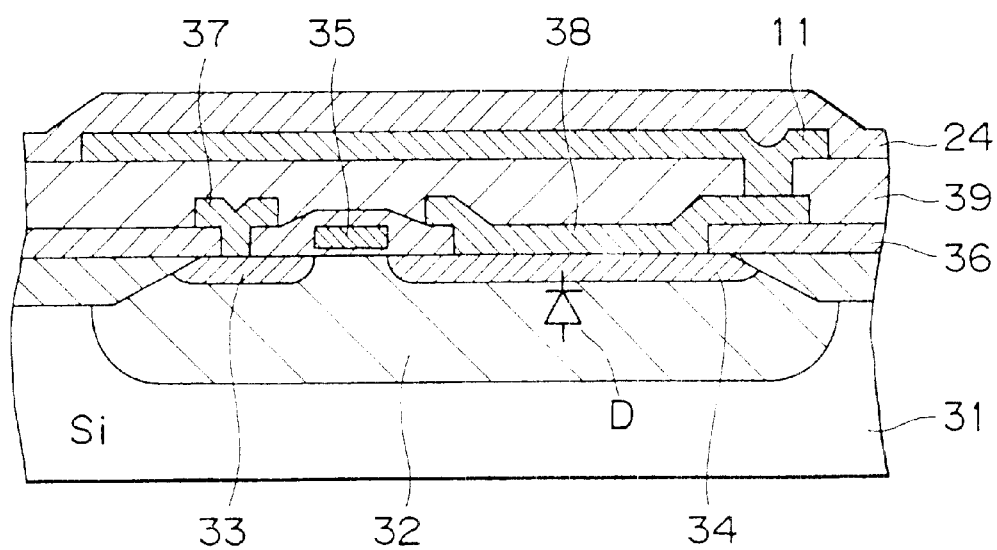
FIG. 6 is a sectional view showing an example of a constitution of the MOS transistor used as the switching element.

Further, as shown by FIG. 6, by enlarging an area of the source (or drain) of a CMOS device on the side of the detection electrode 11, sizes of parasitic diodes Dp and Dn can be enlarged without enlarging capacitance values of parasitic capacitances Cs1p of the column sense lines . . . 13*m*−1, 13*m*, 13*m*+1, . . . and accordingly, the electrostatic intensity can further be strengthened.

In FIG. 6, on a substrate surface side of a well (ground) 32 of a silicon substrate 31, for example, there are formed a diffusion region 33 for constituting a drain region and a diffusion region 34 for constituting a source region and a gate electrode 35 is arranged above a channel between the two diffusion regions 33 and 34.

In this case, the source region 34 is formed such that an area thereof is significantly larger than that of the drain region 33. Further, the diode D is parasitic to an intermediary between the source region 34 and the well 32 and the parasitic diode D functions as a static electricity protecting element for protecting the MOS transistor against electrostatic breakdown.

The drain region 33 is electrically connected with a drain electrode 37 via a silicon oxide film 36 and the source electrode 34 is connected with a source electrode 38 via the silicon oxide film 36. The gate electrode 35 is connected to each of the row drive lines . . . , 12*n*−1, 12*n*, 12*n*+1, . . . and the drain electrode is connected to each of the column sense lines . . . , 13*m*−1, 13*m*, 13*m*+1, . . .

The detection electrode 11 is formed above the MOS transistor structure via an interlayer insulating film 39. The detection electrode 11 is electrically connected with the source electrode via the interlayer insulating film 39. Further, the upper portion of the detection electrode 11 is covered with the overcoat 24.

In the meantime, as is known from Equation (4), described above, a signal intended to sample is ΔVcCs/Cf, however, there necessarily causes a DC offset of ΔVcCsp/Cp. A ratio Rsn of a signal component as compared with the output voltage excluding the reference voltage Vref is as shown below.

$$Rsn = (\Delta VcCs/Cf)/(\{(\Delta VcCs/Cf) + (\Delta VcCsp/Cf)\} \qquad (5)$$

$$= Cs/(CS + Csp)$$

Accordingly, even when ΔVc is increased or the feedback capacitance Cf of each of the detecting circuits . . . , 15*m*−1, $15m$, $15m+1$, . . . is reduced to increase the gain of the output, a signal capable of being outputted from each of the detecting circuits . . . , $15m-1$, $15m$, $15m+1$, . . . is restricted by VDR Cs/(Cs+Csp) when a dynamic range of each of the detecting circuits . . . , $15m-1$, $15m$, $15m+1$, . . . is designated by notation VDR and a sensitivity equal to or more than the value cannot be provided.

As an example, assuming that a material of the overcoat 24 is SiN, the thickness is set to 2.0 $\mu$m, a material of the interlayer film between the detection electrode 11 and the substrate is $SiO_2$, the thickness is set to 1.6 $\mu$m, the specific inductive capacity $\epsilon_0$ of SiN is set to 7.5 and the specific inductive capacity $\epsilon_0$ of $SiO_2$ is set to 3.9, the ratio Rsn of a signal component as compared with an output voltage (excluding reference voltage Vref) at this occasion is as shown below.

$$Rsn=(7.5/2)/(7.5/2+3.9/1.6)=0.606$$

and accordingly, a signal of about 60% of the dynamic range VDR of each of the detecting circuits . . . , $15m-1$, $15m$, $15m+1$, . . . can be outputted.

Actually, there are present an air layer and a nonconductive leather substance between the finger and the overcoat 24 and therefore, the ratio Rsn of the signal component as compared with the output voltage (excluding reference voltage Vref) becomes a smaller value. Further, when the film thickness of the overcoat 24 is thickened to promote the strength of the surface of the sensor (an aggregation of the detection electrodes 11) the ratio Rsn of the signal component as compared with the output voltage becomes smaller and accordingly, there causes a limit also in promoting strengthening of the surface of the sensor.

Figure 7:
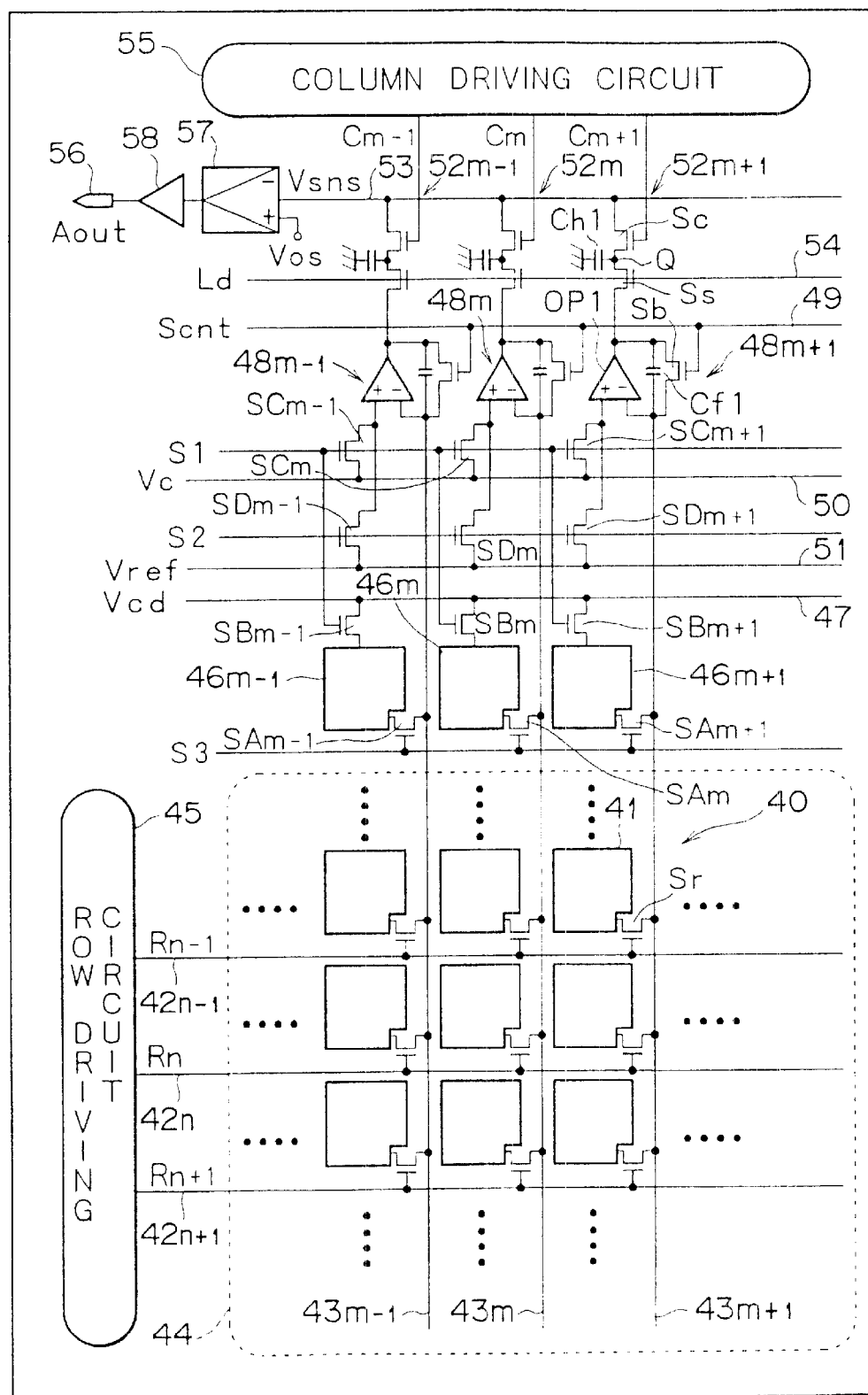
FIG. 7 is a total constitution diagram showing a capacitance detecting apparatus according to a second embodiment of the present invention.

There is provided a capacitance detecting apparatus according to a second embodiment of the present invention which resolves the problem of the DC offset caused by the parasitic capacitance Csp of the detection electrode 11. FIG. 7 is a total constitution diagram showing the capacitance detecting apparatus according to the second embodiment of the present invention and in this case, showing an example of a case in which the electrostatic apparatus is used as a fingerprint detecting apparatus similar to the case of the first embodiment.

In FIG. 7, the detection electrodes 41 are arranged in an array shape on the surface of a semiconductor and row selecting lines . . . $42n-1$, $42n$, $42n+1$, . . . as well as column sense lines . . . , $43m-1$, $43m$, $43m+1$, . . . are wired to the detection electrodes 41 in a matrix shape. Further, cell selecting switches (for example, NchMOS transistors) Sr are connected between the respective detection electrodes 41 and the column sense lines . . . , $43m-1$, $43m$, $43m+1$, . . . and constitute unit cells 40 along with the detection electrodes 41.

A sensor unit 44 is constituted by arranging the unit cells 40 in an array shape. According to the sensor unit 44, the gates of the cell selecting switches Sr of the unit cells 40 are connected to the row selecting lines . . . , $42n-1$, $42n$, $42n+1$, . . . Respective ends of the row selecting lines . . . , $42n-1$, $42n$, $42n+1$, . . . are connected to output ends of respective rows of a row driving circuit 45.

Outside of the region of the sensor unit 44, there are arranged dummy electrodes . . . , $46m-1$, $46m$, $46m+1$, . . . are arranged on the surface of the semiconductor in correspondence with, for example, respective rows of the unit cells 40. Each of the dummy electrodes . . . , $46m-1$, $46m$, $46m+1$, . . . is formed such that a parasitic capacitance in respect of a substrate or the like is substantially equal to a parasitic capacitance of the detection electrode 41 of the unit cell 40. The parasitic capacitance is determined by a shape, an area or the like of an electrode.

Selecting switches (for example, NchMOS transistors) . . . SAm-1, SAm, SAm+1, . . . are respectively connected between the dummy electrodes . . . , $46m-1$, $46m$, $46m+1$, . . . and the column sense lines . . . , $43m-1$, $43m$, $43m+1$, . . . The respective gates of the selecting switches . . . , SAm-1, SAm, SAm+1, . . . are provided with a switch control signal S3 from a timing controller (not illustrated).

Charge switches (for example, NchMOS transistors) . . . SBm-1, SBm, SBm+1, . . . are connected between respectives of the dummy electrodes . . . , $46m-1$, $46m$, $46m+1$, . . . and a charge voltage supply line 47. Further, charge voltage Vcd supplied by the charge voltage supply line 47 is selectively provided to the dummy electrodes $46m-1$, $46m$, $46m+1$, . . . by the charge switches . . . , SBm-1, SBm, SBm+1, . . . The respective gates of the charge switches . . . , SBm-1, SBm, SBm+1, . . . are provided with a switch control signal S1 from the timing controller, mentioned above.

Respective ends of the column sense lines . . . , $43m-1$, $43m$, $43m+1$, . . . are connective with respective circuit input ends of detecting circuits . . . , $48m-1$, $48m$, $48m+1$, . . . Each of the detecting circuits . . . $48m-1$, $48m$, $48m+1$, . . . comprises an operational amplifier OP1 an inverse phase input end of which is connected to one end of each of the column sense lines . . . , $43m-1$, $43m$, $43m+1$, . . . , a feedback capacitor Cf1 connected between the inverse phase input end and an output end of the operational amplifier OP1 and a bypass switch (for example, NchMOS transistor) Sb connected in parallel with the feedback capacitance Cf1.

In each of the detecting circuits . . . , $48m-1$, $48m$, $48m+1$, . . . , the gate of the bypass switch Sb is connected to a control line 49. The control line 49 transmits a detecting circuit control signal Scnt provided from the timing controller, mentioned above, to the gates of the respective bypass switches Sb of the detecting circuits . . . , $48m-1$, $48m$, $48m+1$, . . .

Further, selecting switches (for example, NchMOS transistors) . . . , SCm-1, SCm, SCm+1, . . . are connected between positive phase input ends of the operational amplifiers OP1 and a charge voltage supply line 50. Further, charge voltage Vc supplied by the charge voltage supply line 50 is selectively provided to the positive phase input ends of the operational amplifiers OP1 by the selecting switches . . . , SCm-1, SCm, SCm+1, . . . The respective gates of the selecting switches . . . , SCm-1, SCm, SCm+1, . . . are provided with the switch control signal S1 the same as that of the charge switches . . . , SBm-1, SBm, SBm+1, . . .

Further, selecting switches (for example, NchMOS transistors) . . . , SDm-1, SDm, SDm+1, . . . are connected between the positive phase input ends of the operational amplifiers OP1 and a reference voltage supply line 51. Further, reference voltage Vref supplied by the reference voltage supply line 51 is selectively supplied to the positive phase input ends of the operational amplifiers OP1 by the selecting switches . . . , SDm-1, SDm, SDm+1, . . The respective gates of the selecting switches . . . , SDm-1, SDm, SDm+1, . . . are provided with a switch control signal S2 from the timing controller, mentioned above.

Respective output ends (output ends of operational amplifiers OP1) of the detecting circuits . . . , $48m-1$, $48m$, $48m+1$, . . . are connected with respective input ends of sample and hold circuits . . . , $52m-1$, $52m$, $52m+1$, . . . Each of the sample and hold circuits . . . , $52m-1$, $52m$, 52*m*+1, . . . comprises, for example, NchMOS transistors Ss and Sc connected in series between the output end of each of the detecting circuits . . . , 48*m*−1, 48*m*, 48*m*+1, . . . and an output signal line 53 and a hold capacitor Ch1 connected between a common connection point Q connecting these and the ground.

In the sample and hold circuits . . . , 52*m*−1, 52*m*, 52*m*+1, . . . , the gates of the MOS transistors Ss are connected to a load line 54 and function as sampling switches. The load line 54 is provided with a load signal Ld from the timing controller, mentioned above. Further, the MOS transistors Sc function as column selecting switches by providing column selecting signals . . . , Cm−1, Cm, Cm+1, . . . from a column driving circuit 55 to gates thereof.

An output amplifier 57 and an output buffer 58 are successively connected between one end of the output signal line 53 and an output terminal 56. According to the output amplifier 57, predetermined reference voltage Vos is set to be a positive phase input thereof and respective detected outputs Vsns from the detecting circuits . . . , 48*m*−1, 48*m*, 48*m*+1, . . . supplied via the sample and hold circuits . . . 52*m*−1, 52*m*, 52*m*+1, . . . and the output signal line 53, are set to be inverse phase inputs.

In this case, when the gain of the output amplifier 57 is designated by A, in the case where the reference voltage Vref is provided as positive phase inputs of the respective operational amplifiers OP1 in the detecting circuits . . . , 48*m*−1, 48*m*, 48*m*+1, . . . , the reference voltage Vref, reference voltage Vos, a difference Vswg between the reference voltage Vos and a minimum value (or a maximum value) of the output dynamic range and the gain A of the output amplifier 57, are set to satisfy the following equation.

$$|Vref-Vos|=Vswg/A \qquad (6)$$

Figure 8:
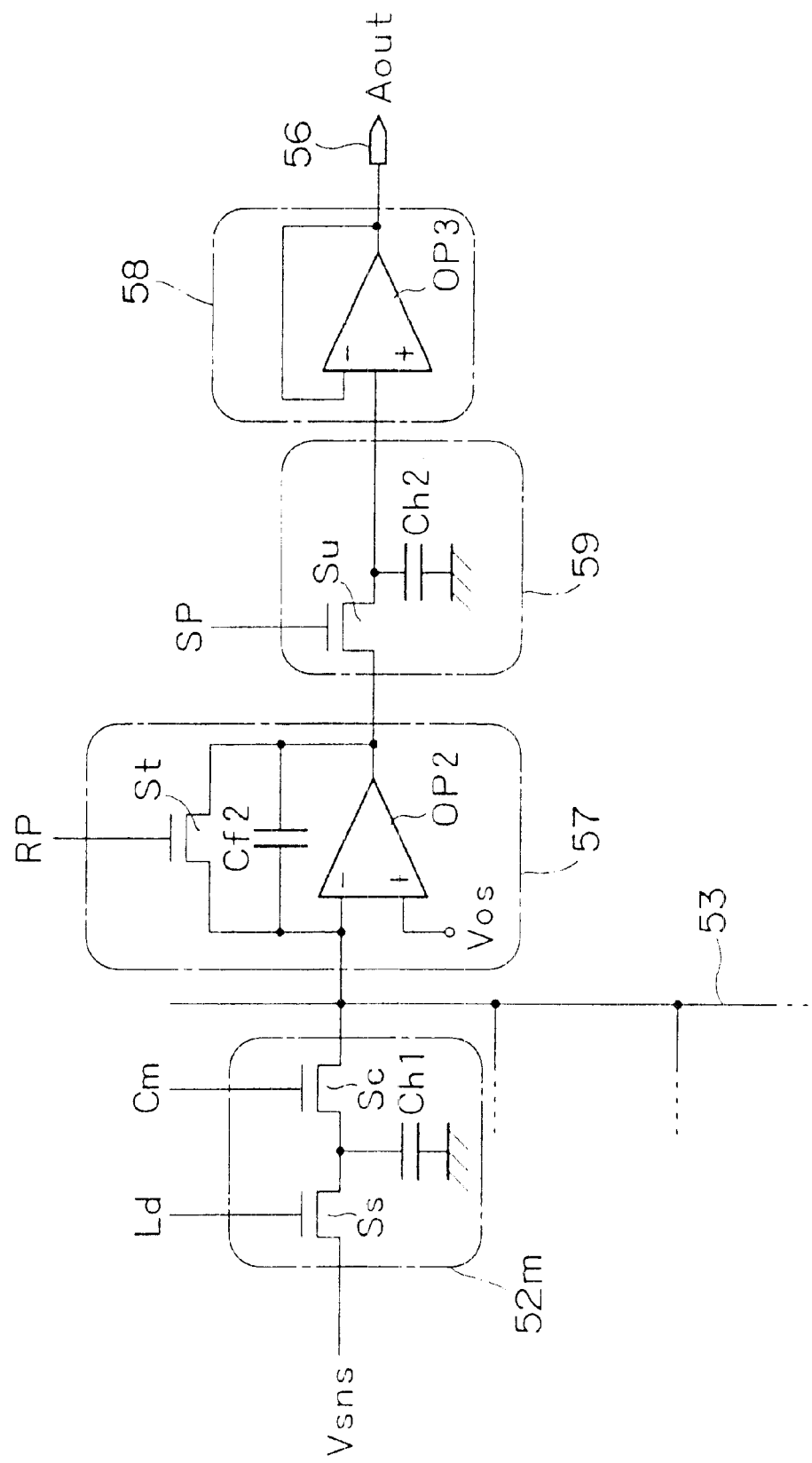
FIG. 8 is a circuit diagram showing an example of a specific circuit constitution of an output portion of the capacitance detecting apparatus according to the second embodiment.

FIG. 8 shows an example of a specific constitution in a route from each of the sample and hold circuits . . . , 52*m*−1, 52*m*, 52*m*+1, . . . to the output terminal 56. According to the specific example, there is constructed a constitution in which a sample and hold circuit 59 is arranged between the output amplifier 57 and the output buffer 58. However, the sample and hold circuit 59 is not indispensable but may be arranged as necessary.

In FIG. 8, the output amplifier 57 comprises an operational amplifier OP2 with the reference voltage Vos as a positive phase input and each of detected outputs Vsns from the detecting circuits . . . , 48*m*−1, 48*m*, 48*m*+1, . . . supplied via the sample and hold circuits . . . , 52*m*−1, 52*m*, 52*m*+1, . . . as an inverse phase input, a feedback capacitor Cf2 connected between the inverse phase input end and an output end of the operational amplifier OP2 and a bypass switch (for example, NchMOS transistor) St connected in parallel with the feedback capacitor Cf2.

In the output amplifier 57, the gate of the bypass switch St is provided with a reset pulse RP from the timing controller, mentioned above. The gain A of the output amplifier 57 is given by a ratio of a capacitance value of the hold capacitor Ch1 of each of the sample and hold circuits . . . , 52*m*−1, 52*m*, 52*m*+1, . . . and a capacitance value of the feedback capacitor Cf2. That is, the gain A of the output amplifier 57 becomes A=Ch1/Cf2.

The sample and hold circuit 59 comprises a sampling switch (for example, NchMOS transistor) Su an input end of which is connected to an output end of the output amplifier 57, that is, an output end of the operational amplifier OP2 and a hold capacitor Ch2 connected between an output end of the sampling switch Su and the ground. The gate of the sampling switch Su is provided with a sampling pulse SP from the timing controller, mentioned above.

The output buffer 58 is constituted by an operational amplifier OP3 in which a hold output from the hold capacitor Ch2 in the sample and hold circuit 59 is made a positive phase input and an inverse phase input end and an output end thereof are shortcircuited.

Next, an explanation will be given of operation of a total of the capacitance detecting apparatus according to the second embodiment having the above-described constitution.

First, by sequentially providing row driving signals . . . , Rn−1, Rn, Rn+1, . . . to he row selecting lines . . . , 42*n*−1, 42*n*, 42*n*+1, . . . by scanning in the row direction by the row driving circuit 45, the cell selecting switches Sr are brought into the ON state by a unit of row and the detection electrodes 41 of corresponding rows are selected. Then, electric charge accumulated at the respective detection electrodes 41 of the selected rows are supplied to the detecting circuits . . . , 48*m*−1, 48*m*, 48*m*+1, . . . via the respective cell selecting switches Sr and the column sense lines . . . , 43*m*−1, 43*m*, 43*m*+1. . .

The detecting circuits . . . , 48*m*−1, 48*m*, 48*m*+1, . . . convert electric charge accumulated in the respective detection electrodes 41 of the selected rows into voltage in proportion thereto and supply the voltage to the sample and hold circuits . . . , 52*m*−1, 52*m*, 52*m*+1, . . . Respectives of the sample and hold circuits . . . , 52*m*−1, 52*m*, 52*m*+1, . . . hold respective output voltage of the detecting circuits . . . , 48*m*−1, 48*m*, 48*m*+1, . . . to the hold capacitors Ch1 by bringing the sampling switches Ss into the ON state by providing the load signal Ld to gates thereof. All of the rows are simultaneously operated until this moment.

Voltage held at the sample and hold circuits . . . 52*m*−1, 52*m*, 52*m*+1, . . . of the respective rows is outputted in series from the output terminal 56 via the output signal line 53, the output amplifier 57 and the output buffer 58 by sequentially outputting the column driving signals . . . , Cm−1, Cm, Cm+1, and sequentially making the column selecting switches Sc from ON to OFF by scanning in the column direction by the column driving circuit 55. By sequentially carrying out the above-described operation in respect of rows selected by the row driving circuit 45, electric charge of all of the detection electrodes 41 can be converted into voltage and successively outputted.

Figure 9:
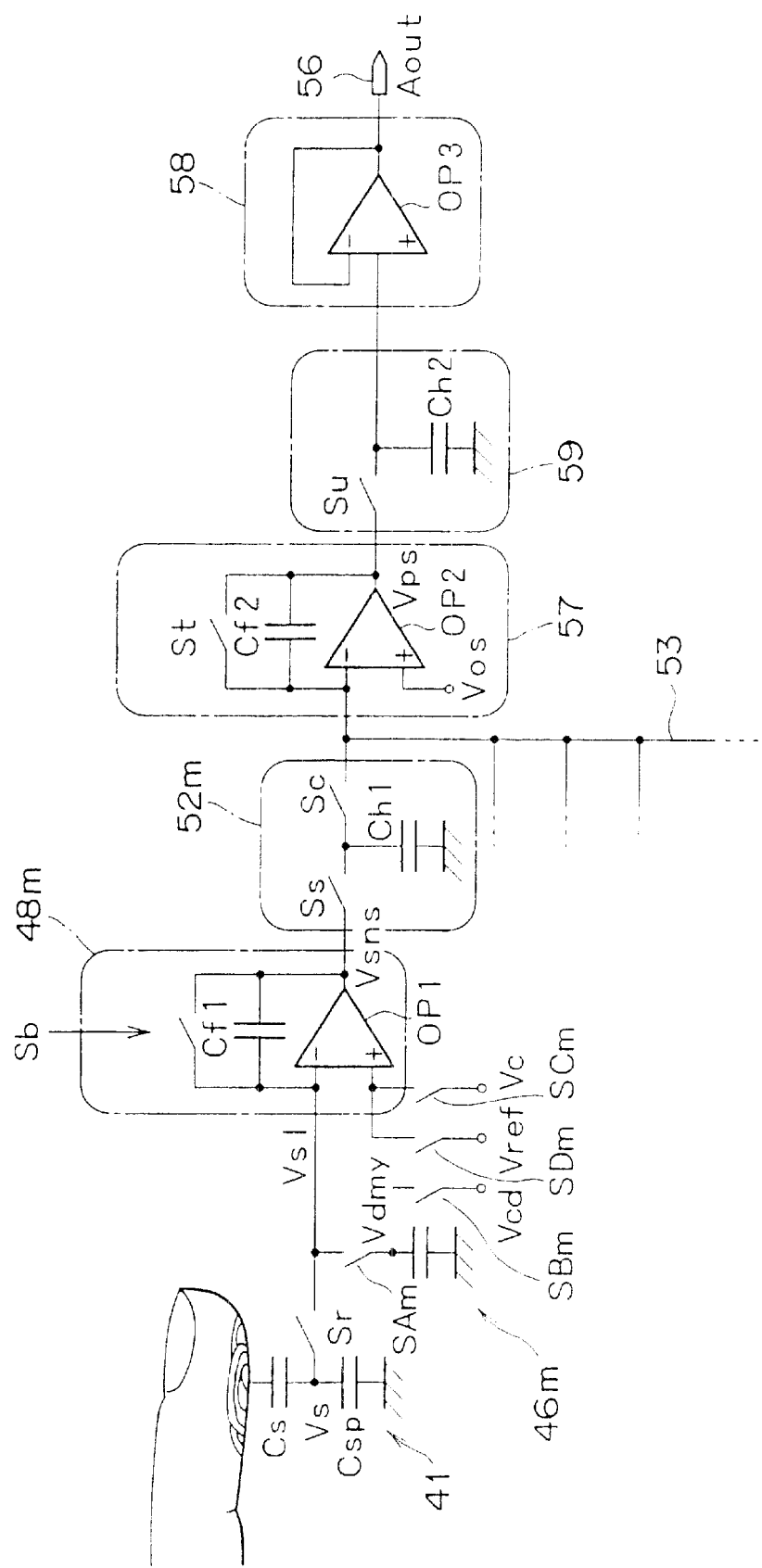
FIG. 9 is an equivalent circuit diagram for explaining the operational principle of the capacitance detecting apparatus according to the second embodiment.
Figure 10:
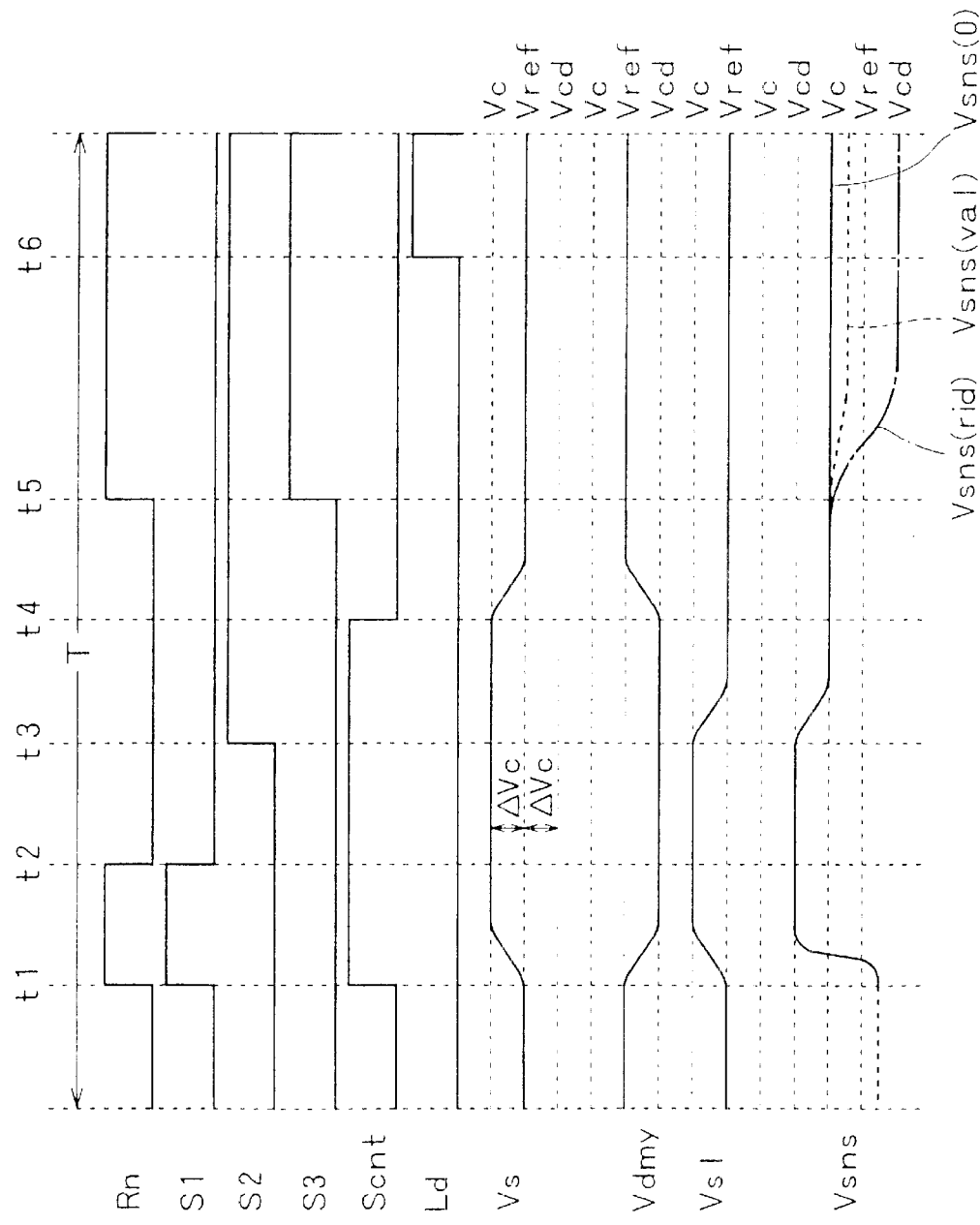
FIG. 10 illustrates timing charts for explaining the operational principle of the capacitance detecting apparatus according to the second embodiment.

An explanation will be given here of operation of the detecting circuits . . . , 48*m*−1, 48*m*, 48*m*+1, . . . constituting the characterizing point of the present invention by taking an example of the detecting circuit 48*m* at an m-th column in reference to FIG. 9 and FIG. 10. FIG. 9 is an equivalent circuit diagram for explaining the operational principle in which a route from the selected one detection electrode 41 to the output terminal 56 is extracted. Further, FIG. 10 illustrates timing charts for explaining the operational principle.

First, at time t1, by providing a detecting circuit control signal Scnt at "H" level, the bypass switch Sb is brought into the ON state. Thereby, the detecting circuit 48*m* is provided with a constitution of a voltage follower circuit. That is, the detecting circuit 48*m* is operated as a noninverting amplifying circuit in which the input resistance is very large, the output resistance is substantially equal to null and the voltage amplifying degree is Av=1.

Simultaneously therewith, by outputting a row driving signal Rn at "H" level from the row driving circuit 45, the cell selecting switch Sr of each unit cell 40 at an n-th row is brought into the ON state to thereby connect the detection electrode 41 and the column sense line 43*m*. Further, by providing the switch control signal S1 at "H" level, the selecting switch Scm is brought into the ON state to thereby provide the charge voltage Vc supplied by the charge voltage supply line 50 to the operational amplifier OP1 as its positive phase input.

At this moment, the operational amplifier OP carries out voltage follower operation and accordingly, voltage Vs1 of the column sense line 43*m* connected to an output end of the operational amplifier OP1 via the bypass switch Sb and the voltage Vs of the detection electrode 41 connected to the column sense line 43*m* via the cell selecting switch Sr, become the charge voltage Vc. Thereby, the capacitance Cs formed between the detection electrode 41 and the surface (fingerprint) of the finger and the parasitic capacitance Csp between the detection electrode 41 and the substrate are accumulated with electric charge in proportion to respective capacitance values.

Further, at the same time, by providing the switch control signal S1 at "H" level, the charge switch Sbm is brought into the ON state and the charge voltage Vcd supplied by the charge voltage supply line 47 is applied to the dummy electrode 46*m*. Respective voltage at this occasion is set to satisfy the following condition.

$$Vc-Vref=-(Vcd-Vref)=\Delta Vc \qquad (7)$$

Next, at time t2, the row driving signal Rn transits to "L" level by which the cell selecting switch Sr is brought into the OFF state. At this moment, electric charge accumulated in the detection electrode 41 is held even when the cell selecting switch Sr is brought into the OFF state and accordingly, the voltage Vs of the detection electrode 41 remains unchanged and stays to be the charge voltage Vc. Simultaneously therewith, the switch control signal S1 also transits to "L" level and therefore, the charge switch SBm and the selecting switch SCm are brought into the OFF state.

Next, at time t3, the switch control signal S2 transits to "H" level by which the selecting switch SDm is brought into the ON state to thereby provide the reference voltage Vref supplied by the reference voltage supply line 51 to the operational amplifier OP1 as its positive phase input. Then, at this occasion, the voltage Vs1 of the column sense line 43*m* changes to the reference voltage Vref.

At this moment, the cell selecting switch Sr stays in the OFF state and the detection electrode 41 is separated from the column sense line 43*m* and accordingly, electric charge accumulated in the capacitance Cs between the detection electrode and the fingerprint and the parasitic capacitance Csp between the detection electrode and the substrate is maintained and accordingly, the voltage Vs of the detection electrode 41 remains unchanged and stays to be the charge voltage Vc.

Next, at time t4, the detecting circuit control signal Scnt transits to "L" level by which the respective bypass switch Sb of the detecting circuit 48*m* is brought into the OFF state. At this moment, the operational amplifier OP1 is negatively fed back by the feedback capacitor Cf1 and accordingly, the row sense line 43*m* is imaginarily grounded to the reference voltage Vref.

Next, at time t5, the row driving signal Rn again transits to "H" level by which the cell selecting switch Sr is brought into the ON state. Thereby, the detection electrode 41 the voltage Vs of which has been the charge voltage Vc is connected to the row sense line 43*m* which is imaginarily grounded to the reference voltage Vref and accordingly, the voltage Vs of the detection electrode 41 is changed from the charge voltage Vc to the reference voltage Vref. Further, when the switch control signal S3 transits to "H" level simultaneously therewith, the selecting switch SAm is brought into the ON state, voltage Vdmy of the dummy electrode 46*m* is changed from the charge voltage Vcd to the reference voltage Vref and electric charge in accordance with the voltage change flows from the detection electrode 41 and the dummy electrode 46*m* and is stored in the feedback capacitor Cf1 of the detecting circuit 48*m*.

At this moment, electric charge ΔQs flowing out from the detection electrode 41 is as shown below.

$$\Delta Qs=(Cs+Csp)\cdot(Vc-Vref)$$

By setting Vc−Vref=ΔVc, the following relationship is established.

$$\Delta Qs=(Cs+Csp)\cdot Vc \qquad (8)$$

Further, electric charge ΔQd flowing out from the dummy electrode 46*m* is shown by the following equation.

$$\Delta Qd=Csp\ (Vcd-Vref)$$

By setting −(Vcd−Vref)=ΔVc, the following relationship is established.

$$\Delta Qd=Csp\times\Delta Vc \qquad (9)$$

These electric charge (ΔQs+ΔQd) is accumulated in the feedback capacitance Cf1 and accordingly, the output voltage Vsns of the operational amplifier OP1 becomes as follows.

$$\begin{aligned}Vsns &= Vref-(\Delta Qs+\Delta Qd)/Cf1 \\ &= Vref-\{(Cs+Csp)\cdot\Delta Vc-Csp\times\Delta Vc\}/Cf1 \\ &= Vref-\Delta Vc\cdot Cs/Cf1\end{aligned} \qquad (10)$$

In this way, by providing the dummy electrode 46 having the parasitic capacitance Csp substantially equal to that of the detection electrode 41 and applying the charge voltages Vc and Vcd respectively satisfying the condition of Equation (7) to the detection electrode 41 and the dummy electrode 46*m* respective electric charge of the parasitic capacitances Csp of the two electrodes 41 and 46*m* can be canceled and therefore, a signal having no DC offset caused by the parasitic capacitance Csp of the detection electrode 41 can be provided.

Further, at time t6, in the sample and hold circuits . . . , 52*m*−1, 52*m*, 52*m*+1, . . . provided for the respective rows, respective voltage Vsns outputted from the detecting circuits . . . , 48*m*−1, 48*m*, 48*m*+1, . . . of the respective rows, are held at the hold capacitances Ch1 by providing the load signal Ld at "H" level to thereby bring the sampling switches Ss into the ON state. Thereafter, by successively making the column selecting switches Sc from ON to OFF by scanning by the column driving circuit 55, the respective voltage Vsns is outputted to the output signal line 53 in series.

Next, an explanation will be given of operation when the respective voltage Vsns provided from the detecting circuits . . . , 48*m*−1, 48*m*, 48*m*+1, . . . in series in reference to timing charts of FIG. 11. First, an explanation will be given of a procedure of reading hold voltage of the sample and hold circuit 52*m* at an m-th row.

In a state before start of horizontal scanning of a certain row, the column selecting signals . . . , Cm−1, Cm, Cm+1, . . . are not outputted from the column driving circuit 55 and accordingly, the column selecting switches (output switches) Sc of all of the sample and hold circuits . . . , 52*m*−1, 52*m*, 52*m*+1, . . . are brought into the OFF state.

Under the state, when the reset pulse RP transits to "H" level at time tm1, the bypass switch St of the output amplifier 57 is brought into the ON state. Thereby, electric charge of the feedback capacitor Cf2 of the output amplifier 57 is reset to null. At this moment, output voltage Vps of the output amplifier 57 becomes reference voltage Vos provided to a positive phase input of the operational amplifier OP2.

Next, after the reset pulse RT transits to "L" level (time tm2), when the column selecting signal Cm for selecting the m-th column is outputted from the column driving circuit 55 at time tm3, the column selecting switch Sc(m) of the sample and hold circuit 52m at the m-th column is brought into the ON state. At this moment, the side of the output amplifier 57 of the column selecting switch Sc(m) is imaginarily grounded to the reference voltage Vos and therefore, electric charge of the hold capacitor Ch1 of the sample and hold circuit 52m flows to the feedback capacitor Cf2 of the output amplifier 57.

Therefore, when hold voltage of the sample and hold circuit 52m at the m-th column, that is, the output voltage of the detecting circuit 48m is designated by Vsns(m), the output voltage Vps of the output amplifier 57 becomes as follows.

$$Vps=Vos-(Vsns(m)-Vos)\cdot(Ch1/Cf2) \quad (11)$$

Next, at time tm4, the column selecting signal Cm of the m-th row extinguishes (transits to "L" level) by which all of the column selecting switches Sc of the sample and hold circuits . . . , 52m−1, 52m, 52m+1, . . . are brought into the OFF state. From this state, by a procedure similar to the above-described, hold voltage of the sample and hold circuit 52m+1 at an (m+1) column is read.

In this way, hold voltage of all of the sample and hold circuits . . . , 52m−1, 52m, 52m+1, . . . can successively be read. In this case, the output voltage Vps of the output amplifier 57 returns to the reference voltage Vos every time of making ON the bypass switch St of the output amplifier 57 and resetting electric charge of the feedback capacitor Cf2 to null.

Figure 11:
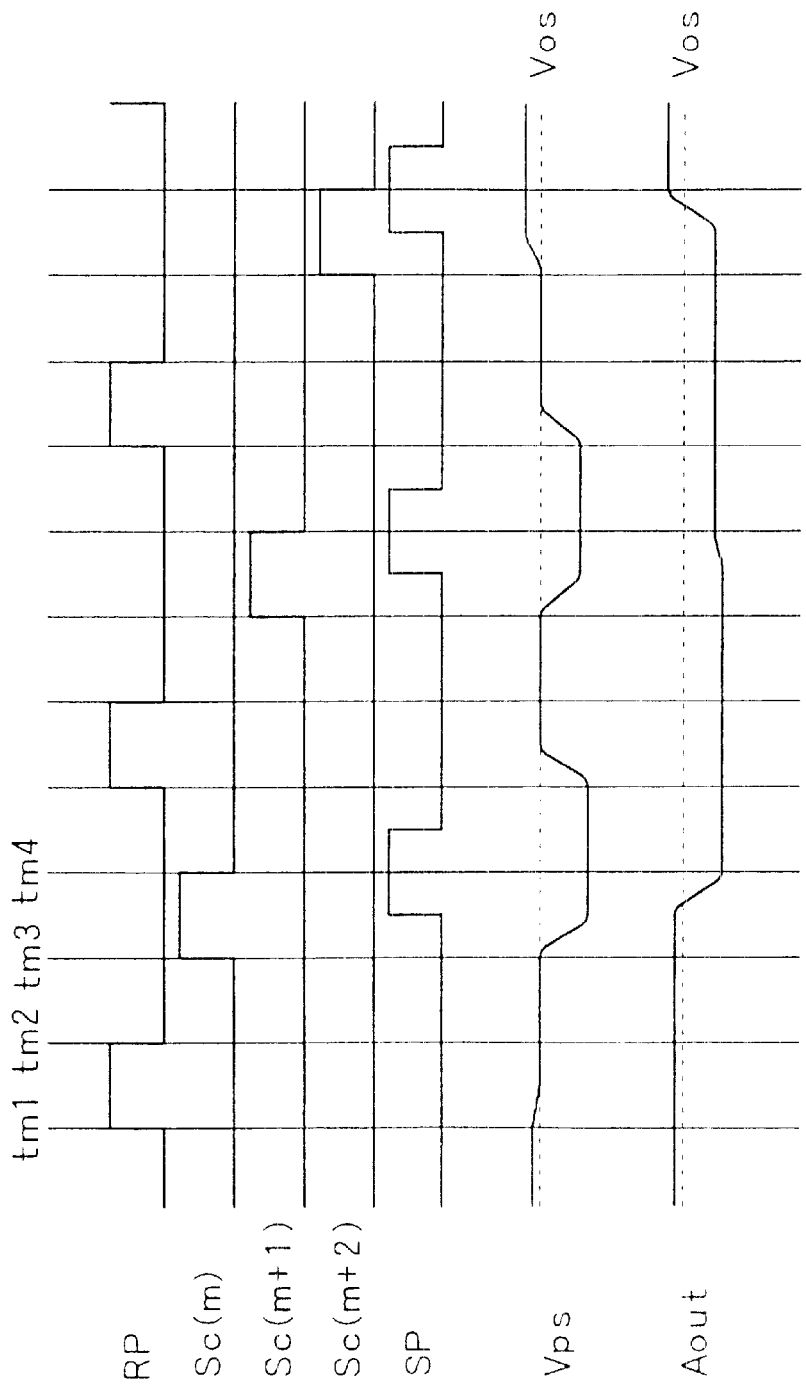
FIG. 11 illustrates timing charts for explaining operation of parallel/serial conversion in the capacitance detecting apparatus according to the second embodiment.

In contrast thereto, according to the embodiment, the sample and hold circuit 59 is provided at the poststage of the output amplifier 57 and the sampling switch Su of the sample and hold circuit 59 is switched by the sampling pulse SP and held to the hold capacitor Ch2 as shown by the timing charts of FIG. 11 by which a temporal portion of the output voltage Vps which returns to the reference voltage Vos every time of presetting the feedback capacitor Cf2 of the output amplifier 57, is extrapolated.

As a result, output voltage Aout led out from the output terminal 56 becomes Aout=Vps and accordingly, by Equation (10) and Equation (11), when the gain of the output amplifier 57 is designated by A (=Ch1/Cf2), the output voltage Aout becomes as shown below.

$$Aout=Vos-(Vref-Vos-\Delta Vc\cdot Cs/Cf1)\cdot A \quad (12)$$

When Cs=0, the output voltage Aout is minimized and therefore, from Equation (12), a minimum value Aout (MIN) of the output voltage Aout is as shown by the following equation.

$$Aout(MIN)=Vos-(Vref-Vos)\cdot A \quad (13)$$

and the reference voltage Vref and Vos and the gain A of the output amplifier 57 can freely be set. Further, as is apparent from Equation (12), the gain (sensitivity) of the sensor can be controlled by changing ΔVc.

Figure 12:
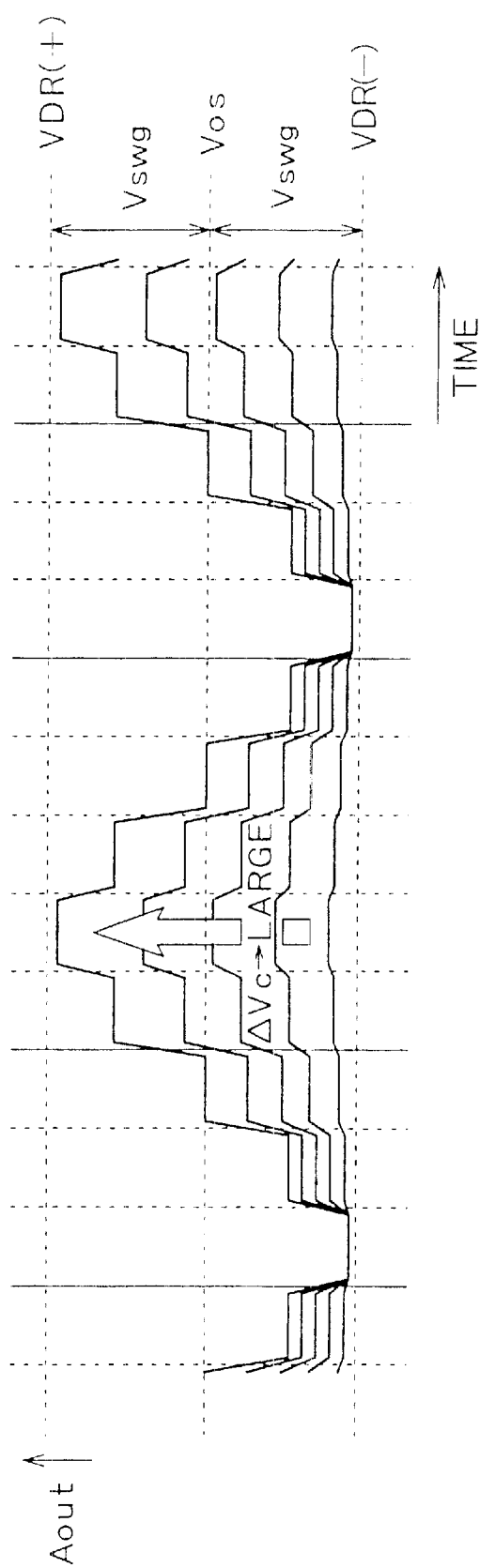
FIG. 12 is a waveform diagram showing a behavior of changing gain in accordance with Vc.

When the dynamic range of the sensor output is set to VDR(−) through VDR(+) (that is, a minimum value of the dynamic range is set to VDR(−) and a maximum value thereof is set to VDR(+)), by adjusting the reference voltages Vref and Vos and the gain A of the output amplifier 57 to establish the following equation and adjusting ΔVc, signal maximally using the dynamic range of the sensor output can be sampled as shown by FIG. 12.

$$Aout(MIN)=VDR(-) \quad (14)$$

In this case, when a difference between the reference voltage Vos and the minimum value VDR(−) or the maximum value VDR(+) of the dynamic range is designated by notation Vswg as follows, $$VDR(-)=Vos-Vswg, \ VDR(+)=Vos+Vswg,$$

in order to establish Aout(MIN)=VDR(−), the following relationship may be established.

$$Vref-Vos=Vswg/A \quad (15)$$

As described above, according to the capacitance detecting apparatus of the second embodiment, the dummy electrode 46m having the parasitic capacitance Csp which is substantially equal to that of the detection electrode 41 is provided and the detection electrode 41 and the dummy electrode 46m are respectively provided with the charge voltages Vc and Vcd having polarities inverse to each other of the voltage value ΔVc relative to the reference voltage Vref by which electric charge of the parasitic capacitance of the detection electrode 41 can be canceled by electric charge of the parasitic capacitance of the dummy electrode 46m and accordingly, there can be provided a signal having no DC offset caused by the parasitic capacitance Csp of the detection electrode 41.

Further, by adjusting the voltage value ΔVc derived from the charge voltages Vc and Vcd, regardless of the magnitude of the capacitance Cs between the detection electrode and the fingerprint, there can be sampled a signal maximally using the dynamic range VDR of the output. As a result, the sensitivity of detecting the fingerprint can significantly be improved and therefore, the film thickness of the overcoat (refer to FIG. 5) covering the detection electrode 41 can be thickened and accordingly, the strength of the surface of the sensor can be promoted.

Further, according to the embodiment, there is constructed the constitution in which the dummy electrodes . . . , 46m−1, 46m, 46m+1, . . . are provided at respective columns of the unit cells 40 and connected to the column sense lines . . . , 43m−1, 43m, 43m+1, . . . via the selecting switches SAm−1, SAm, SAm+1, . . . by which electric charge of the parasitic capacitances of the detection electrodes and dummy electrodes are directly canceled, however, the present invention is not limited to the constitution.

As one example, there can be constructed a constitution in which, for example, only one piece of a dummy electrode having a parasitic capacitance substantially equal to that of the detection electrode 41 is arranged outside the region of the sensor unit 44, in a signal processing system at an output stage, voltage based on electric charge of the parasitic capacitance of the single dummy electrode is held and subtracted successively from the output voltage Vsns of the detecting circuits . . . , 48m−1, 48m, 48m+1, . . . outputted in series by which the electric charge of the respective parasitic capacitance is canceled at the stage of signal processing.

Further, according to the embodiment, an explanation has been given of the case of applying to the capacitance detecting apparatus using the voltage charge method in which electric charge is charged to the detection electrodes 41, after charging, the column sense lines . . . , 43m−1, 43m, 43m+1, . . . are imaginarily grounded and electric charge of the capacitances Cs formed between the detection electrodes 41 and the finger (fingerprint) are detected via the column sense lines . . . , 43m−1, 43m, 43m+1, . . . However, the present invention is applicable to a capacitance detecting apparatus using other voltage charge method and also to a capacitance detecting apparatus using a current charge method in which constant electric charge is charged to the detection electrodes 41 and thereafter, the voltage change of the detection electrodes 41 is detected.

Further, although according to the above-described first and second embodiments, an explanation has been given by taking the example of the case in which the capacitance detecting apparatus according to the invention is used as the fingerprint detecting apparatus, the present invention is not limited to detection of the fingerprint but can be used in detecting a general recess and projection pattern in which the capacitance Cs is formed between the recess and projection pattern and the detection electrode 11 or 41 when the recess and projection pattern is put on the overcoat 24 (refer to FIG. 5) covering the detection electrode 11 or 41.

In the meantime, when the finger is not put on the overcoat 24 covering the detection electrodes 11 or 41 arranged in an array shape, the capacitances Cs are not formed and the capacitance value are nullified and therefore, only electric charge accumulated in the parasitic capacitances Csp of the detection electrodes 11 or 41 is outputted. The output voltage Vsns (0) in this case becomes as shown below from Equation (3).

$$Vsns(0)=Vref-Csp\times(Vc-Vref)/Cf$$

Accordingly, by selecting the respective detection electrode 11 or 41 and outputting the voltage Vsns(0), operation of the cell selecting switch Cr connected to the detection electrode 11 or 41 for each cell can be confirmed and therefore, inspection in delivery of the detecting apparatus can easily be carried out without assumedly producing a state in which the finger is not thereon.

Figure 14:
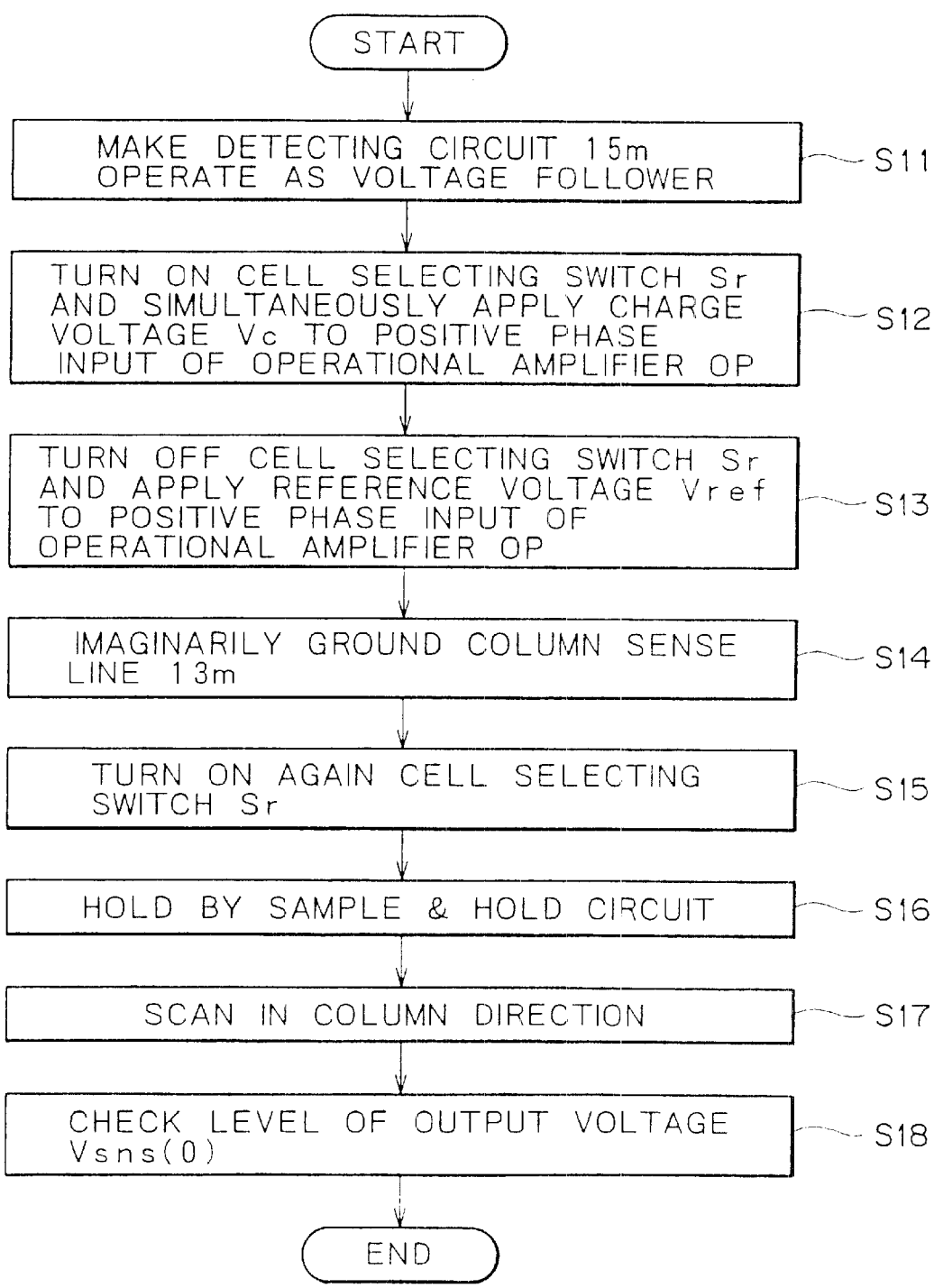
FIG. 14 is a flowchart showing a procedure of the inspecting method according to the present invention.

An explanation will be given of a procedure of a method of inspecting the detecting apparatus by taking an example of the capacitance detecting apparatus according to the first embodiment in reference to an operational principle diagram of FIG. 13 and following a flowchart of FIG. 14 as follows. Incidentally, portions in FIG. 13 equivalent to those in FIG. 2 are shown by attaching the same notations. Further, the operational principle for the inspection is basically the same as the operational principle, mentioned above, and differs therefrom only in that the capacitance Cs is not formed.

First, the circuit is made to operate as a voltage follower by turning on the bypass switch Sb of the detecting circuit 15m (step S11). Successively, the cell selecting switch Sr is turned on by carrying out scanning in the row direction to thereby connect the detection electrode 11 and the column sense line 13m and simultaneously therewith, the charge voltage Vc is applied to the operational amplifier OP as its positive phase input by the change-over switch SW (step S12).

At this moment, the operational amplifier OP operates as a voltage follower and therefore, the voltage Vs1 of the column sense line 13m connected to the output end of the operational amplifier OP via the bypass Sb and the voltage Vs of the detection electrode 11 connected to the column sense line 13m via the cell selecting switch Sr, become the charge voltage Vc. Thereby, the parasitic capacitance Csp between the detection electrode 11 and the substrate is accumulated with electric charge in proportion to the capacitance value.

Next, the cell selecting switch Sr is turned off and the reference voltage Vref is applied to the operational amplifier OP as its positive phase input in place of the charge voltage Vc by the change-over switch SW (step S13). At this moment, the detection electrode 11 is separated from the column sense line 13m and therefore, the electric charge accumulated in the parasitic capacitance Csp between the detection electrode 11 and the substrate is held and accordingly, the voltage Vs of the detection electrode 11 remains unchanged and stays to be the charge voltage Vc.

Next, the bypass switch Sb is turned off and the column sense line 13m is imaginarily grounded to the reference voltage Vref (step S14), successively, the cell selecting switch Sr is turned on again (step S15). Thereby, the voltage Vc of the detection electrode 11 is changed from the charge voltage Vc to the reference voltage Vref. As a result, electric charge in accordance with the voltage change flows from the parasitic capacitance Csp and accumulated in the feedback capacitance Cf.

At this moment, the electric charge ΔQ(0) flowing out from the detection electrode 11 is as shown below.

$$\Delta Q(0)=Csp\cdot(Vc-Vref)$$

The electric charge ΔQ(0) is accumulated in the feedback capacitance Cf and accordingly, the output voltage Vsns(0) of the operational amplifier OP becomes as follows.

$$Vsns(0)=Vref-Csp\times(Vc-Vref)/Cf$$

Next, voltage Vsns(0) outputted from the detecting circuits . . . , 15m−1, 15m, 15m+1, . . . of the respective rows, are held by the sample and hold circuits . . . , 18m−1, 18m, 18m+1, . . . (step S16) and successively, scanning in the column direction is carried out to thereby output the voltage Vsns(0) in series (step S17). Further, by checking levels of the output voltage Vsns(0), the acceptability of the cell selecting switch Sr, that is, whether the cell selecting switch Sr is normally operated is confirmed (step S18).

Although an explanation has been given here of the procedure of the inspecting method by taking an example of the case of the capacitance detecting apparatus according to the first embodiment, the inspection can be realized by a procedure similar to that in the case of the capacitance detecting apparatus according to the second embodiment. However, according to the capacitance detecting apparatus of the second embodiment, there are installed the dummy electrodes . . . , 46m−1, 46m, 46m+1, . . . and therefore, by always bringing the cell selecting switches Sr of the respective unit cells 40 into the offstate to thereby stop the canceling function based on the parasitic capacitances of the dummy electrodes, only electric charge accumulated in the parasitic capacitances Csp of the detection electrodes 41 can be detected and accordingly, operation of the cell selecting switches Sr of the unit cells 40 can be confirmed.

Figure 15:
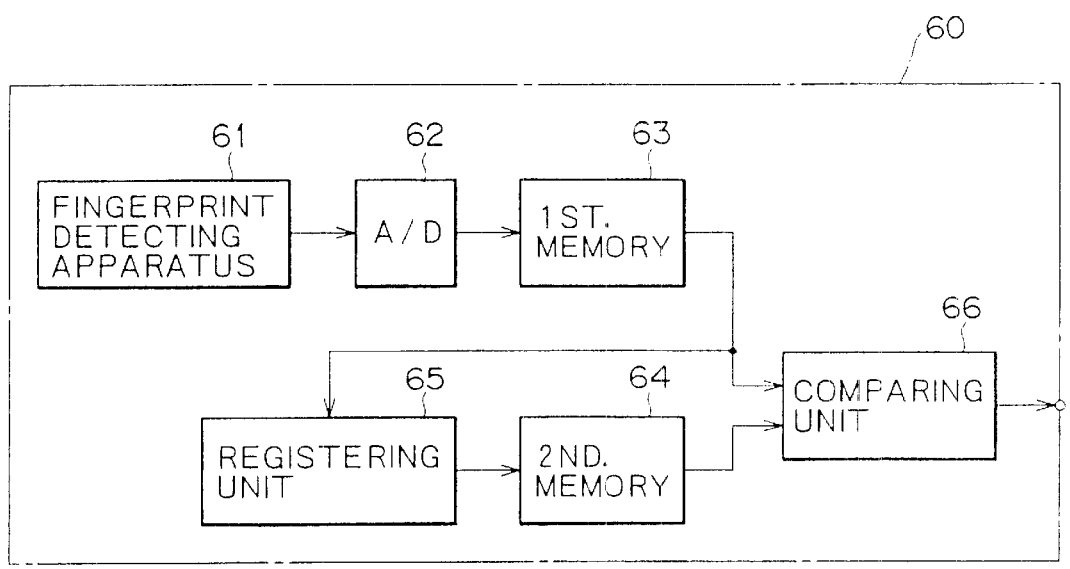
FIG. 15 is a block diagram showing an example of a constitution of a fingerprint checking apparatus according to the present invention.

FIG. 15 is a block diagram showing an example of a constitution of a fingerprint checking apparatus according to the present invention in which the capacitance detecting apparatus according to the first or the second embodiments having the above-described constitutions is used as fingerprint detecting apparatus (finger print sensor). In FIG. 15, a fingerprint checking apparatus 60 according to the example comprises a fingerprint detecting apparatus 61, an A/D converter 62, a first and a second memory 63 and 64, a registering unit 65 and a comparing unit 66.

According to the fingerprint checking apparatus 60 having the above-described constitution, as the finger print detecting apparatus 61, there is used the capacitance detecting apparatus according to the first or the second embodiment having the above-described constitution. That is, the fingerprint detecting apparatus 61 is constructed by a constitution in which the detection electrodes 11 (41) arranged in an array shape are provided as shown by FIG. 1 (or FIG. 7), electric charge is charged to the detection electrodes 11 (41) under constant charge voltage, thereafter, the column sense lines . . . , 13m–1, 13m, 13m+1, . . . ( . . . , 43m–1, 43m, 43m+1, . . . ) are imaginarily grounded and the capacitances Cs formed between the detection electrodes 11 (41) and the surface of the finger in accordance with recesses and projections of the fingerprint are detected.

The output voltage from the fingerprint checking apparatus 60 is digitized by the A/D converter 62 and thereafter stored to the first memory 63. The registering unit 65 is used in previously registering a fingerprint pattern constituting a checking object and the registering unit 65 samples, for example, only characteristic points from the fingerprint data stored to the first memory 63 in registering the fingerprint pattern and stores the data of a group of characteristic points to the second memory 64 as registered pattern data.

In checking the fingerprint, the comparing unit 66 compares detected fingerprint data which is detected by the fingerprint detecting apparatus 61 and stored to the first memory 63 with the registered pattern data previously stored to the second memory 64 in respect of, for example, the characteristic points. Further, when the detected fingerprint data coincide with the registered pattern data, the comparing unit 66 determines that the fingerprint detected by the fingerprint detecting apparatus 61 is a previously registered fingerprint and outputs a check result stating the determination to outside.

Further, although in this example, the fingerprint data detected by the fingerprint detecting apparatus 61 is temporarily stored to the first memory 63, the first memory 63 can be omitted when it is not necessary in view of signal processing.

Figure 16:
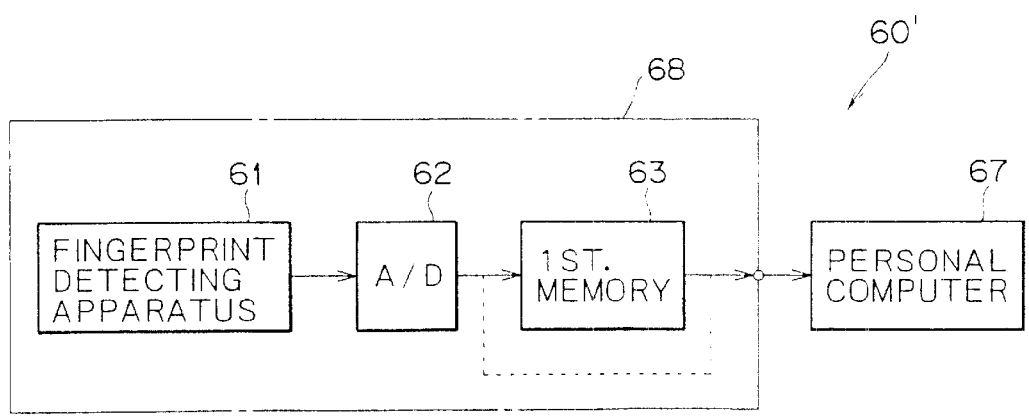
FIG. 16 is a block diagram showing other example of the constitution of the fingerprint checking apparatus according to the present invention.
Figure 17:
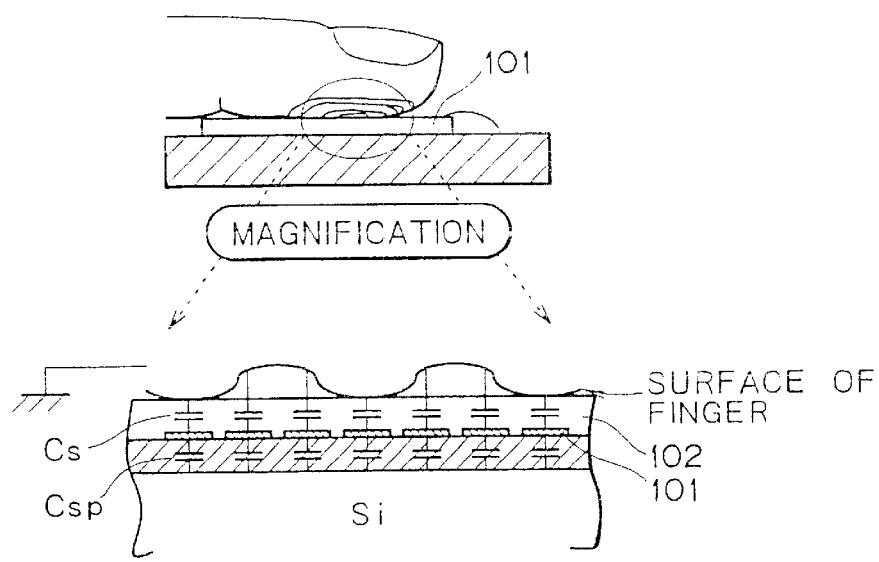
FIG. 17 is a view illustrating the principle of a fingerprint detecting apparatus for sensing capacitance.
Figure 18:
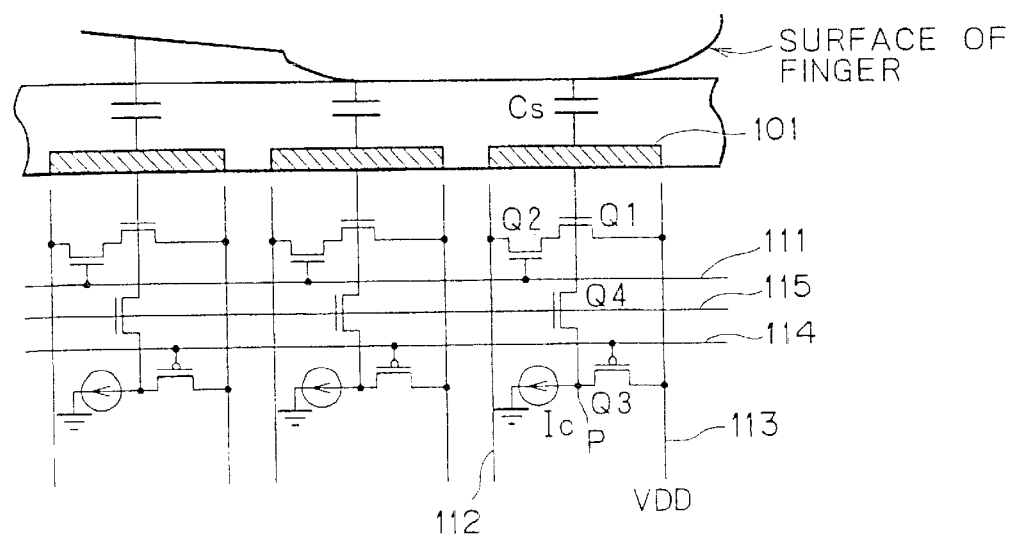
FIG. 18 is a circuit diagram showing a conventional example of a fingerprint detecting apparatus using a current charge method.
Figure 19:
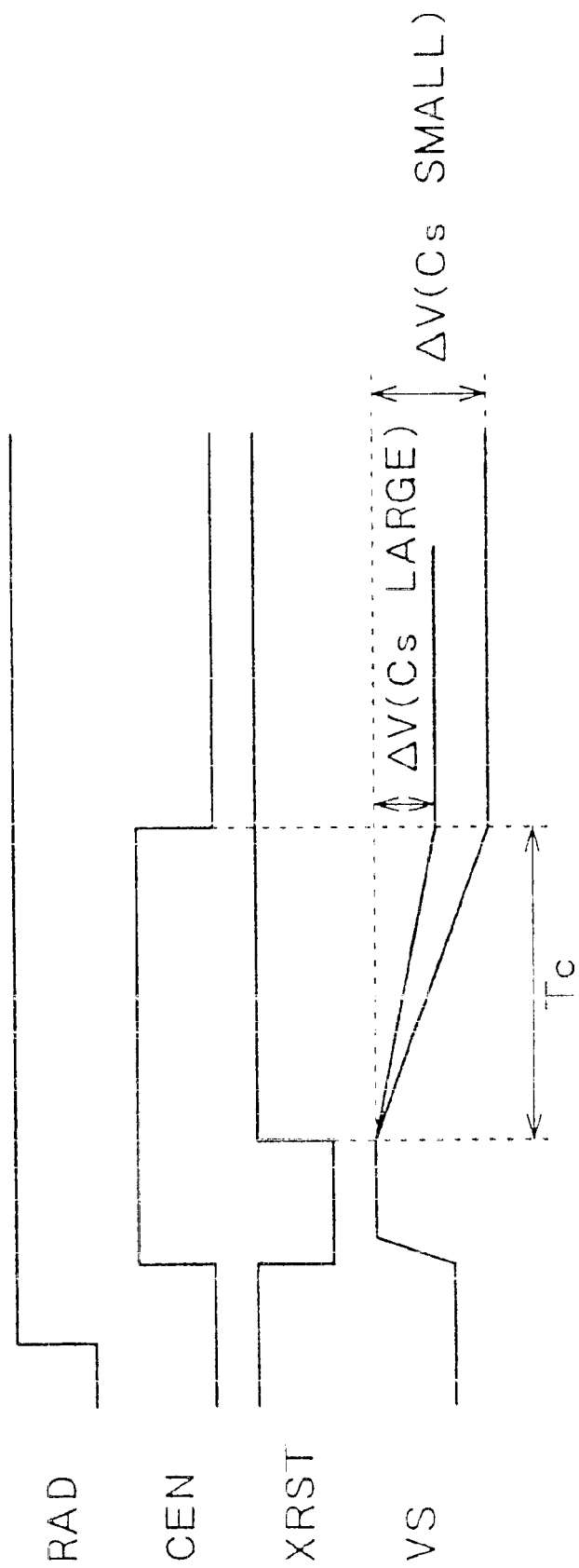
FIG. 19 illustrates timing charts for explaining operation of the circuit of FIG. 18.

Further, as shown by FIG. 16, it is possible that the finger print checking apparatus 61, the A/D converter 62 and the first memory 63 (the memory 63 can be omitted as indicated by dotted line) are constituted as one unit 68, an output from the unit 68 is provided to a personal computer 67 and the personal computer 67 is provided with functions of the second memory 64, the registering unit 65 and the comparing unit 66 to thereby constitute the fingerprint checking apparatus 60' by generally synthesizing these.

As has been explained, according to the present invention, in a capacitance detecting apparatus arranged with unit cells having detection electrodes and switching elements connected between the detection electrodes and sense lines in an array shape and a fingerprint checking apparatus using thereof, electric charge is charged to the detection electrodes under constant voltage, thereafter, the sense lines are imaginarily grounded and capacitances formed between a detection object and the detection electrodes are detected via the sense lines by which a detection cell can be realized by one of the switching elements and voltage in accordance with the capacitances can be detected with excellent S/N without being dependent on a dispersion of element characteristics of detection cell.

Further, in a capacitance detecting apparatus for charging electric charge to detection electrodes and detecting voltage based on the electric charge to thereby detect capacitances formed between a detection object and the detection electrodes and a fingerprint checking apparatus using thereof, there are provided dummy electrodes having parasitic capacitances substantially equal to parasitic capacitances of the detection electrodes, electric charge of the parasitic capacitances of the detection electrodes is canceled by electric charge of the parasitic capacitances of the dummy electrodes by which DC offset caused by the parasitic capacitances of the detection electrodes can be eliminated and accordingly, the dynamic range of the sensor output can significantly be improved.

What is claimed is:

1. A capacitance detecting apparatus comprising:

unit cells having detection electrodes and switching elements connected between the detection electrodes and sense lines and arranged in an array shape;

charging and discharging circuits for charging electric charge to said detection electrodes under constant voltage and discharging the electric charge; and detecting circuits for imaginarily grounding said sense lines after charging the electric charge to said detection electrodes and detecting the electric charge of said detection electrodes via the sense lines to thereby detect capacitances formed between a detection object and the detection electrodes, wherein said sense lines serve also as charge and/or discharge lines of said charging and discharging circuits, wherein said detecting circuits serve also as said charging and discharging circuits, wherein said detecting circuit comprises:

an operational amplifier an inverse phase input end of which is connected to said sense line and a positive phase input end of which is applied alternatively with said constant voltage or a predetermined reference voltage;

a feedback capacitor connected between the inverse phase input end and an output end of the operational amplifier; and a bypass switch for selectively bypassing said feedback capacitor.

2. The capacitance detecting apparatus according to claim 1:

wherein the capacitance formed between the detection object and said detection electrode is capacitance formed between the detection electrode and a surface of a finger in accordance with recesses and projections of a fingerprint.

3. The capacitance detecting apparatus according to claim 1:

wherein said switching element comprises an MOS transistor or a CMOS transistor a source or a drain of which is connected to said detection electrode.

4. The capacitance detecting apparatus according to claim 3:

wherein said MOS transistor or said CMOS transistor serves also as a static electricity protecting element.

5. The capacitance detecting apparatus according to claim 1, further comprising:

holding means for holding a detected output from said detecting circuit.

6. A capacitance detecting apparatus comprising:

unit cells having detection electrodes and switching elements connected between the detection electrodes and sense lines and arranged in an array shape;

detecting means for detecting capacitances formed between a detection object and the detection electrodes by charging electric charge to said detection electrodes and detecting voltage based on the electric charge; and dummy electrodes having parasitic capacitances substantially equal to parasitic capacitances of said detection electrodes, one of said dummy electrodes being alternately disconnected from and connected to one of said sense lines when one of said detection electrodes is alternately conected to and disconnected from said one of said sense lines;

wherein electric charge of the parasitic capacitances of said detection electrodes is canceled by electric charge of the parasitic capacitances of said dummy electrodes.

7. The capacitance detecting apparatus according to claim 6:

wherein said detecting means comprise:

charging and discharging circuits for charging electric charge to said detection electrodes under constant voltage and discharging the electric charge; and detecting circuits for imaginarily grounding said sense lines after charging the electric charge to said detection electrodes to thereby detect the electric charge of said detection electrodes via the sense lines.

8. The capacitance detecting apparatus according to claim 7:

wherein said detecting circuit comprises:

an operational amplifier an inverse phase input end of which is connected to said sense line and a positive phase input end of which is applied alternatively with said constant voltage or a predetermined reference voltage Vref;

a feedback capacitor connected between the inverse phase input end and an output end of the operational amplifier; and a bypass switch for selectively bypassing said feedback capacitor.

9. The capacitance detecting apparatus according to claim 8, further comprising:

an output amplifier for inputting predetermined reference voltage Vos as one input, inputting a detected output Vsns from the detecting circuit as the other input and having a gain A;

wherein when a difference between said reference voltage Vos and a minimum value or a maximum value of an output dynamic range is designated by a notation Vswg, when the reference voltage Vref is applied to said detecting circuit, the reference voltage Vref, the reference voltage Vos and the difference Vswg between the reference voltage Vos and the minimum value of the output dynamic range and the gain A of the output amplifier are set to satisfy the following condition:

$|Vref-Vos|=Vswg/A$.

10. The capacitance detecting apparatus according to claim 9, further comprising:

a hold circuit for holding a detected output from said detecting circuit between said detecting circuit and said output amplifier;

wherein the gain A of said output amplifier is given by a ratio of a hold capacitor of said hold circuit to the feedback capacitor of said output amplifier.

11. The capacitance detected apparatus according to claim 6:

wherein said dummy electrodes are connected to said sense lines via switching element for respective rows of said unit cells.

12. A capacitance detecting apparatus comprising:

a plurality of detection electrodes, a detection electrode of said plurality of detection electrodes being connected to a row selection line and a sense line;

a plurality of detecting circuits, a detecting circuit of said plurality of detecting circuits detecting an electric charge accumulating within said detection electrode, said detecting circuit including an operational amplifier, a feedback capacitor and a bypass switch, said operational amplifier having a positive phase input end, an inverse phase input end, and an output end, said positive phase input end alternately receiving a constant voltage and a reference voltage, said inverse phase input end receiving said electric charge from said sense line, said output end supplying one of said constant voltage and said reference voltage to said sense line, said feedback capacitor being connected to said inverse phase input end and to said output end, said bypass switch being connected to said inverse phase input end and to said output end.

13. A fingerprint checking apparatus comprising:

a fingerprint detecting apparatus having a plurality of detection electrodes and a plurality of detecting circuits, a detection electrode of said plurality of detection electrodes being connected to a row selection line and a sense line, a detecting circuit of said plurality of detecting circuits detecting an electric charge accumulating within said detection electrode, said detecting circuit including an operational amplifier, a feedback capacitor and a bypass switch, said operational amplifier having a positive phase input end, an inverse phase input end, and an output end, said positive phase input end alternately receiving a constant voltage and a reference voltage, said inverse phase input end receiving said electric charge from said sense line, said output end supplying one of said constant voltage and said reference voltage to said sense line, said feedback capacitor being connected to said inverse phase input end and to said output end, said bypass switch being connected to said inverse phase input end and to said output end.

14. The fingerprint checking apparatus according to claim 13 further comprising:

a storing medium, said storing medium storing fingerprint pattern data which has previously been registered.

15. The fingerprint checking apparatus according to claim 14 further comprising:

a comparing unit, said comparing unit comparing fingerprint data detected by said fingerprint detecting apparatus with said fingerprint pattern data.

* * * * *